United States Patent
Fujiwaka

(10) Patent No.: US 11,991,538 B2
(45) Date of Patent: May 21, 2024

(54) WIRELESS COMMUNICATION FAILURE ANALYSIS DEVICE, WIRELESS COMMUNICATION FAILURE ANALYSIS METHOD, AND RECORDING MEDIUM HAVING WIRELESS COMMUNICATION FAILURE ANALYSIS PROGRAM STORED THEREIN

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 17/419,175

(22) PCT Filed: Dec. 6, 2019

(86) PCT No.: PCT/JP2019/047755
§ 371 (c)(1),
(2) Date: Jun. 28, 2021

(87) PCT Pub. No.: WO2020/144987
PCT Pub. Date: Jul. 16, 2020

(65) Prior Publication Data
US 2022/0110006 A1 Apr. 7, 2022

(30) Foreign Application Priority Data
Jan. 10, 2019 (JP) .................. 2019-002687

(51) Int. Cl.
*H04W 24/02* (2009.01)
*H04W 4/02* (2018.01)
(Continued)

(52) U.S. Cl.
CPC .......... *H04W 24/02* (2013.01); *H04W 4/021* (2013.01); *H04W 4/027* (2013.01); *H04W 24/08* (2013.01)

(58) Field of Classification Search
CPC ..... H04W 4/021; H04W 24/02; H04W 24/08; H04B 17/391
See application file for complete search history.

(56) References Cited

U.S. PATENT DOCUMENTS

2011/0287801 A1* 11/2011 Levin .................. H04B 17/391
455/67.11
2012/0157007 A1 6/2012 Yoneyama et al.
(Continued)

FOREIGN PATENT DOCUMENTS

JP 2010147519 A 7/2010
JP 2014241574 A 12/2014
(Continued)

OTHER PUBLICATIONS

International Search Report for PCT Application No. PCT/JP2019/047755, dated Jan. 7, 2020.
(Continued)

*Primary Examiner* — Sulaiman Nooristany

(57) ABSTRACT

A wireless communication failure analysis device comprises: an estimator which, based on a measured communication state between an access point and a communication terminal, and an estimation of an obstacle affecting the communication state, estimates a movement locus of the communication terminal; a corrector which corrects the movement locus based on restriction information indicating a movement restriction of the communication terminal; a generator which generates the estimation result based on a corrected movement locus and the measurement result; and a controller which generates the restriction information so as to gradually strengthen the movement restriction until the movement restriction satisfies a condition, and controls the estimator and generator such that the estimation of the movement locus, the correction of the movement locus, and the generation of the estimation result repeatedly. Thus, the (Continued)

device analyzes presence of an obstacle that affects the wireless communication state efficiently and accurately.

20 Claims, 18 Drawing Sheets

(51) Int. Cl.
  *H04W 4/021* (2018.01)
  *H04W 24/08* (2009.01)

(56) References Cited

U.S. PATENT DOCUMENTS

2014/0114635 A1    4/2014    Sato et al.
2015/0263920 A1    9/2015    Nagata

FOREIGN PATENT DOCUMENTS

| JP | 5915776 B2 | 5/2016 |
| WO | 2011030466 A1 | 3/2011 |
| WO | 2012172670 A1 | 12/2012 |

OTHER PUBLICATIONS

English translation of Written opinion for PCT Application No. PCT/JP2019/047755, dated Jan. 7, 2020.

\* cited by examiner

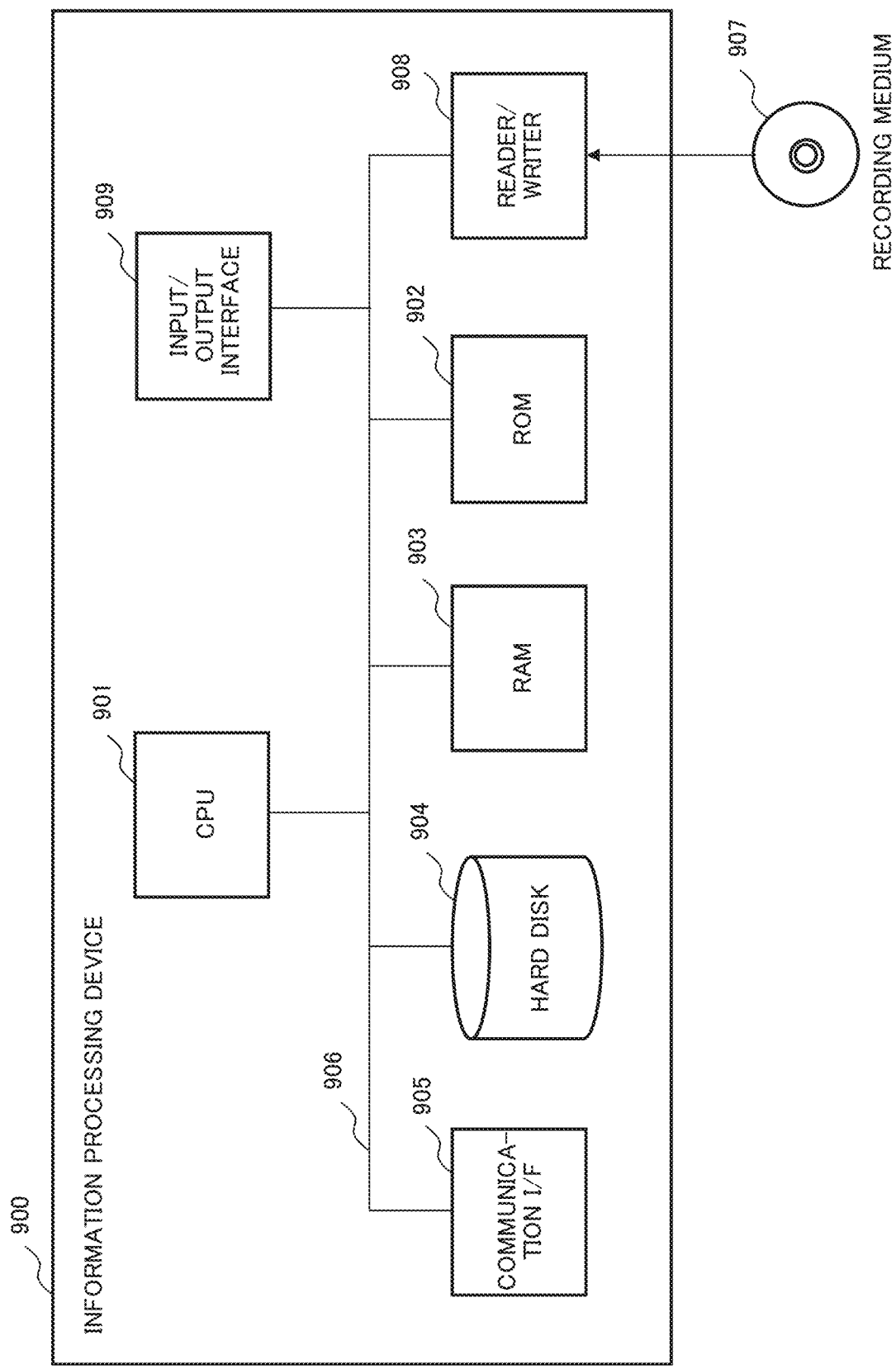

WIRELESS COMMUNICATION FAILURE ANALYSIS DEVICE, WIRELESS COMMUNICATION FAILURE ANALYSIS METHOD, AND RECORDING MEDIUM HAVING WIRELESS COMMUNICATION FAILURE ANALYSIS PROGRAM STORED THEREIN

This application is a National Stage Entry of PCT/JP2019/047755 filed on Dec. 6, 2019, which claims priority from Japanese Patent Application 2019-002687 filed on Jan. 10, 2019, the contents of all of which are incorporated herein by reference, in their entirety.

TECHNICAL FIELD

The present invention relates to a technique of analyzing a presence situation of an obstacle that affects wireless communication.

BACKGROUND ART

In recent years, an information and communication technology (ICT) system utilizing a wireless network has been introduced to a construction site, a plant, and the like, for the purpose of improving productivity and improving safety. For example, when an operation state of production equipment is monitored via a wireless network by using a sensor, a problem such as a defect of the production equipment can be detected quickly. Alternatively, standby time, inefficient behavior, and the like during work are analyzed based on information on a position of a worker, which is acquired via a wireless network, whereby production efficiency can be improved.

In this way, introduction of an ICT system requires establishment of a wireless communication environment in most cases. However, a wireless communication environment (an environment in which a signal is transmitted) at a plant or the like frequently changes along with frequent change of a physical environment, and hence a problem of establishing a stable wireless communication environment arises. Further, there have been increasing expectations for a technique of achieving quick and accurate analysis of causes in a case of occurrence of a wireless communication failure, in order to solve such a problem.

As a technique relating to such a technique, PTL 1 discloses a failure cause determination device that determines a failure cause in a wireless link by acquiring a received signal strength indicator (RSSI) of the wireless link and a packet error rate (PER). The device estimates an RSSI-PER characteristic curve that passes through a point associated to a combination of an RSSI value and a PER value at a first time point that is a predetermined time period before a second time point when the PER becomes equal to or greater than a threshold value, assuming that interference power at the first time point is maintained. Further, the device determines whether a failure is caused by signal interference or deterioration of a signal transmission environment, based on a position relationship of a point associated to a combination of an RSSI value and a PER value at the second time point with respect to the estimated characteristic curve.

Further, PTL 2 discloses a wireless station that is connected to another wireless station via a wireless link and specifies a failure cause in the wireless link. The wireless station executes wireless link control for the wireless link, according to a wireless link control method. While executing the wireless link control, the wireless station acquires statistical information indicating a state of the wireless link. Then, based on the acquired statistical information, the wireless station specifies a failure cause in the wireless link, from among a plurality of failure causes that are associated with the statistical information in advance.

Further, PTL 3 discloses a wireless communication system that autonomously re-constructs a wireless communication path through evaluation of a wireless service area and automatic adjustment of a wireless parameter in a wireless communication environment where signal strength changes when a person or an object moves. A wireless station in the system measures signal strength of a received signal, and when fluctuation of a communication environment is detected by comparing the measured signal strength with past signal strength, the wireless station notifies a central server of the measurement value and the fluctuation generation. Based on the measurement value notified from the wireless station, the central server estimates a fluctuation position in the signal transmission path within the system and a cause, derives a wireless parameter suitable for fluctuation in the communication environment, and notifies the wireless station of the wireless parameter.

CITATION LIST

Patent Literature

[PTL 1] Japanese Patent No. 5915776
[PTL 2] International Patent Publication No. WO 2011/030466
[PTL 3] Japanese Unexamined Patent Application Publication No. 2010-147519

SUMMARY OF INVENTION

Technical Problem

For example, at a site where an environment relating to the wireless communication as described above changes rapidly, it has been expected to establish a stable wireless communication environment more securely and efficiently. Further, in order that a suitable measure capable of improving a deteriorated wireless communication state is to be taken efficiently, there is a problem in analyzing a detailed cause for the deteriorated wireless communication state efficiently and with high accuracy, for example, analyzing whether the cause is attenuation of signal strength due to an obstacle present at a specific location, a long distance between a wireless terminal device and an access point being a communication destination, or the like. It cannot be said that PTLs 1 to 3 are sufficient to solve the problem. A main object of the present invention is to provide a wireless communication failure analysis device and the like that solve the problem.

Solution to Problem

A wireless communication failure analysis device according to one aspect of the present invention includes: an estimation means for estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state; a correction means for correcting the movement locus, based on restriction information indicating a restriction content relating to movement of the communication terminal device; a generation means for generating the estimation result, based on the movement locus that is corrected and the measurement result; and a control means for generating the restriction information in such a way as to gradually strengthen the restriction content until the restriction content satisfies a condition, and executing control in such a way that estimation of the movement locus by the estimation means, correction of the movement locus by the correction means based on the restriction information that is generated, and generation of the estimation result by the generation means are repeatedly performed.

In another view of achieving the above-mentioned object, a wireless communication failure analysis method according to one aspect of the present invention is executed by an information processing device, and includes: estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state; correcting the movement locus, based on restriction information indicating a restriction content relating to movement of the communication terminal device; generating the estimation result, based on the movement locus that is corrected and the measurement result; and generating the restriction information in such a way as to gradually strengthen the restriction content until the restriction content satisfies a condition, and executing control in such a way that estimation of the movement locus, correction of the movement locus based on the restriction information that is generated, and generation of the estimation result are repeatedly performed.

Further, in further view of achieving the above-mentioned object, a wireless communication failure analysis program according to one aspect of the present invention causes a computer to execute: estimation processing of estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state; correction processing of correcting the movement locus, based on restriction information indicating a restriction content relating to movement of the communication terminal device; generation processing of generating the estimation result, based on the movement locus that is corrected and the measurement result; and control processing of generating the restriction information in such a way as to gradually strengthen the restriction content until the restriction content satisfies a condition, and executing control in such a way that estimation of the movement locus in the estimation processing, correction of the movement locus in the correction processing based on the restriction information that is generated, and generation of the estimation result in the generation processing are repeatedly performed.

Further, the present invention may be achieved with a computer-readable non-volatile recording medium in which the wireless communication failure analysis program (computer program) is stored.

Advantageous Effects of Invention

The present invention enables highly accurate and efficient analysis of a presence situation of an obstacle that affects a wireless communication state.

BRIEF DESCRIPTION OF DRAWINGS

FIG. 18 is a block diagram illustrating a configuration of an information processing device 900 capable of executing the wireless communication failure analysis device according to each of the example embodiments of the present invention.

EXAMPLE EMBODIMENT

Now, with reference to the drawings, example embodiments of the present invention are described in detail.

First Example Embodiment

Figure 1:
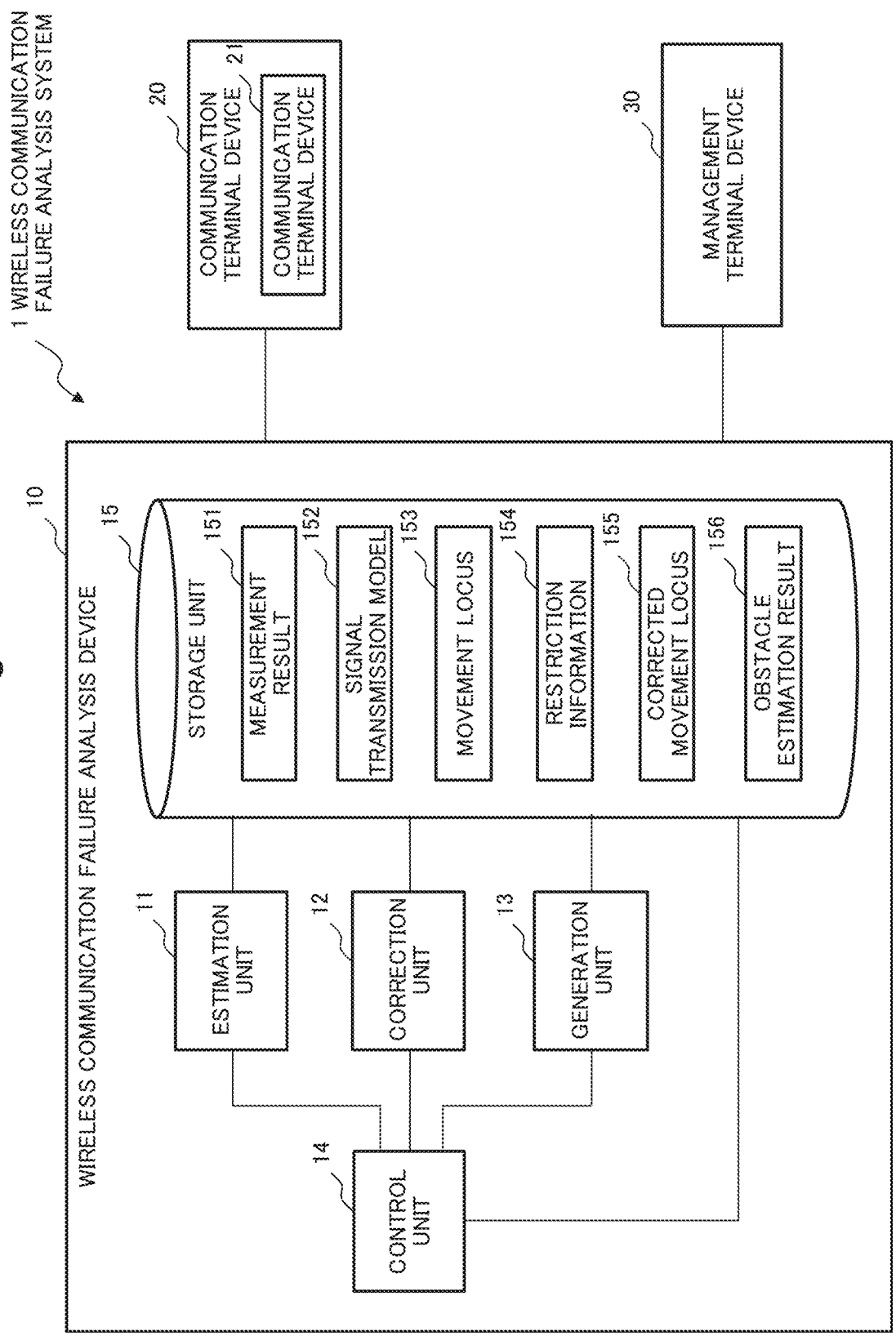
FIG. 1 is a block diagram illustrating a configuration of a wireless communication failure analysis system 1 according to a first example embodiment of the present invention.

FIG. 1 is a block diagram illustrating a configuration of a wireless communication failure analysis system 1 according to a first example embodiment of the present invention. The wireless communication failure analysis system 1 mainly includes a wireless communication failure analysis device 10, a communication terminal device 20, and a management terminal device 30.

For example, the communication terminal device 20 is a mobile terminal device such as a smartphone or a tablet that is carried by a user, and can be connected to a communication network via an access point (a device that relays wireless connection between the mobile terminal device and the communication network: hereinafter, referred to as "AP" in some cases in the present application). The communication terminal device 20 and the wireless communication failure analysis device 10 are connected to each other in a communicable manner via the communication network, by using a communication interface (not illustrated in FIG. 1) included in each of the devices.

The communication terminal device 20 includes a communication state measurement unit 21. The communication state measurement unit 21 measures a communication state between the communication terminal device 20 and an access point (not illustrated in FIG. 1) as needed, and transmits a measurement result 151 to the wireless communication failure analysis device 10. For example, the communication state measurement unit 21 can measure a received signal strength indicator (RSSI) as the communication state.

The management terminal device 30 is an information processing device such as a personal computer, which is used when a user inputs information with respect to the wireless communication failure analysis device 10 or a user confirms information output from the wireless communication failure analysis device 10. The management terminal device 30 and the wireless communication failure analysis device 10 are connected to each other in a communicable manner via the communication network, by using a communication interface (not illustrated in FIG. 1) included in each of the devices.

The wireless communication failure analysis device 10 is an information processing device that analyzes a presence situation of an obstacle that affects a wireless communication environment established in a certain target area.

The wireless communication failure analysis device 10 includes an estimation unit 11, a correction unit 12, a generation unit 13, a control unit 14, and a storage unit 15. For example, the storage unit 15 is a storage device such as an electronic memory or a magnetic disc. The storage unit 15 stores the measurement result 151, a signal transmission model 152, a movement locus 153, restriction information 154, a corrected movement locus 155, and an obstacle estimation result 156. Details of those pieces of information stored in the storage unit 15 are described later.

Figure 2:
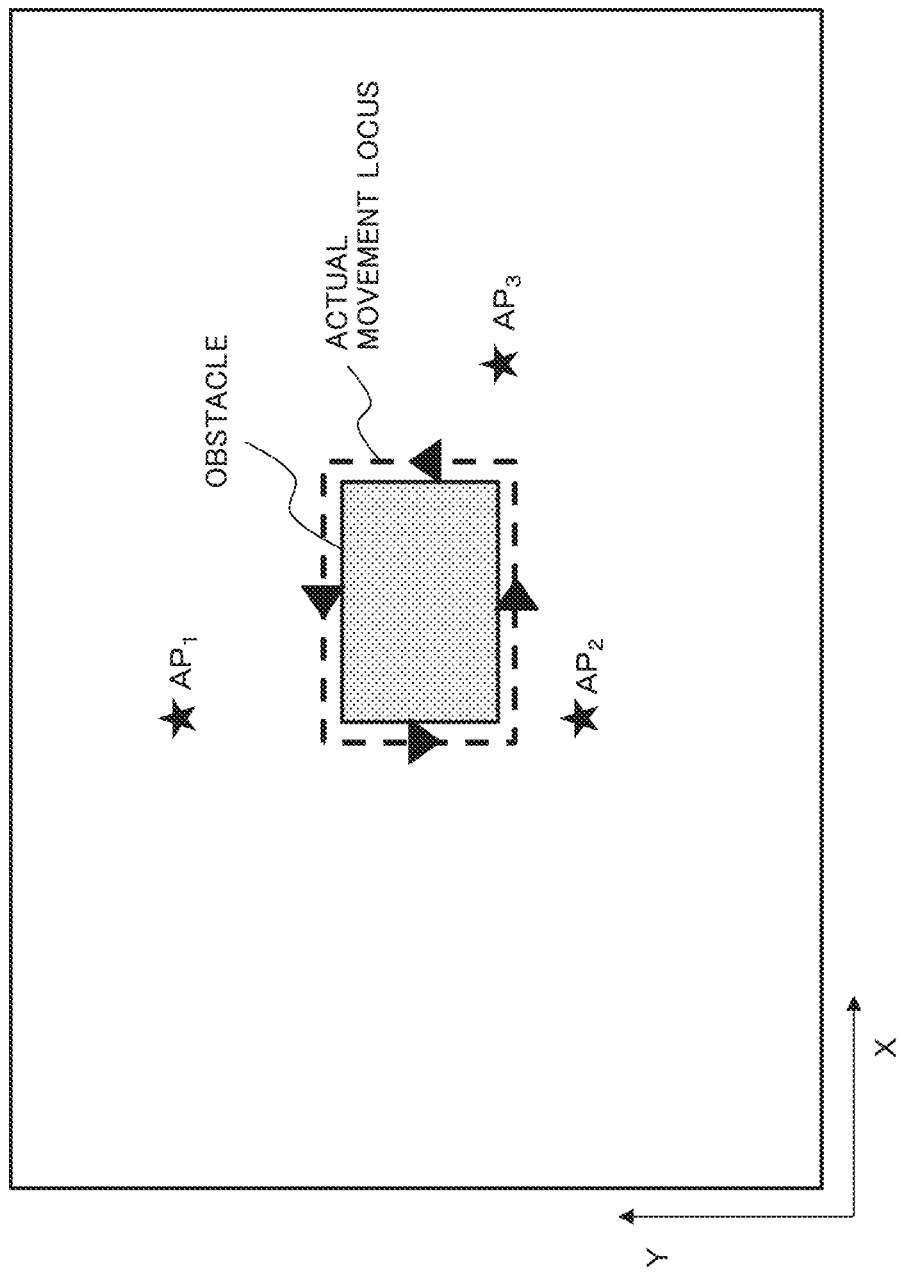
FIG. 2 is a diagram exemplifying arrangement of access points and a presence situation of an obstacle in an area being an analysis target for the wireless communication failure analysis device 10 according to the first example embodiment of the present invention.

FIG. 2 is a diagram exemplifying arrangement of access points (AP) in an area being an analysis target for the wireless communication failure analysis device 10 according to the present example embodiment and a presence situation of an obstacle that affects a wireless communication environment. Note that, for convenience of the description, X-Y coordinate axes indicating a two-dimensional plane are denoted as appropriate in the drawings referred to in the description of the present example embodiment. In the area exemplified in FIG. 2, three access points $AP_1$ to $AP_3$ are arranged. Further, the number of Aps arranged in the analysis target area is not limited to three.

As exemplified in FIG. 2, it is assumed that an obstacle (a hatched part illustrated in FIG. 2) that affects a wireless communication environment is present in the analysis target area for the wireless communication failure analysis device 10 according to the present example embodiment. In the present example embodiment, for example, it is assumed that the obstacle has a sufficient height in a direction to the front side of the drawing sheet. Further, it is assumed that the measurement result 151 measured by the communication terminal device 20 is input to the wireless communication failure analysis device 10 when a user carrying the communication terminal device 20 walks around the obstacle. The input measurement result 151 is stored in the storage unit 15.

Information provided to the wireless communication failure analysis device 10 includes the measurement result 151, a position (coordinate) of each access point, and the restriction information 154 indicating a restriction (limitation) content relating to movement of the communication terminal device 20, which is described later. Specifically, the wireless communication failure analysis device 10 has a function of deriving (estimating) a presence situation of an obstacle and an actual movement locus in which a user walks around the obstacle, based on the provided pieces of information, as described later.

Figure 3:
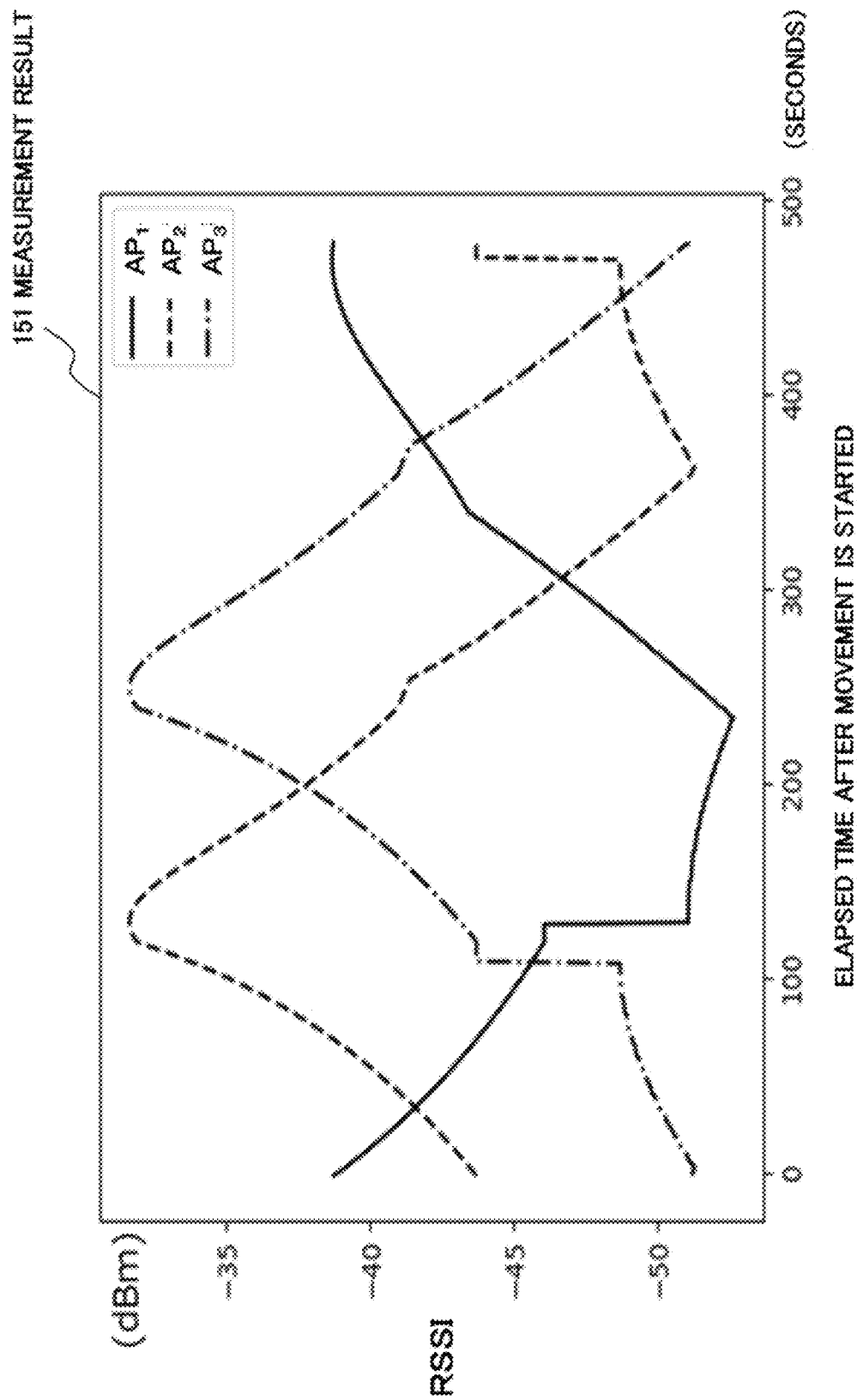
FIG. 3 is a diagram exemplifying a graph showing a measurement result 151 according to the first example embodiment of the present invention.

FIG. 3 is a diagram exemplifying a graph showing the measurement result 151 according to the present example embodiment. It is assumed that the measurement result 151 exemplified in FIG. 3 shows a result measured by the communication terminal device 20 in relation to a communication state of $AP_1$ to $AP_3$ when a user walks around the obstacle as indicated with, for example, the dashed-line arrow illustrated in FIG. 2. However, in the graph exemplified in FIG. 3, the vertical axis indicates RSSI (decibel based one milliwatt: dBm), and the horizontal axis indicates an elapsed time period (second) after a user starts movement from a location closest to $AP_1$ in the movement locus exemplified in FIG. 2, as described later.

According to the measurement result 151 exemplified in FIG. 3, the communication state relating to $AP_1$ gradually deteriorates after a user starts movement (specifically, a distance between $AP_1$ and the communication terminal device 20 is gradually increased), and then turns to a gradually improving trend (specifically, the distance is reduced). In contrast, the communication state relating to $AP_2$ and $AP_3$ is gradually improved after a user starts movement, and then turns to a deteriorating trend, and a peak at which turning from improvement to deterioration occurs is seen in the order of $AP_2$ and $AP_3$. All of these are caused by a user who starts movement from a location closest to $AP_1$ and walks around the obstacle in a counter-clockwise manner in the actual movement locus exemplified in FIG. 2.

The estimation unit 11 illustrated in FIG. 1 estimates the movement locus 153 of the communication terminal device 20, based on the measurement result 151 and the obstacle estimation result 156 indicating an estimation result relating to the presence situation of the obstacle, which is generated by the generation unit 13 to be described later. However, it is assumed that the estimation unit 11 sets absence of an obstacle as an initial value of the obstacle estimation result 156.

First, the estimation unit 11 uses the initial value of the obstacle estimation result 156 (specifically, assuming that no obstacle is present in the analysis target area), and calculates the signal transmission model 152 relating to wireless communication between each of $AP_1$ to $AP_3$ and the communication terminal device 20.

When it is assumed that no obstacle is present in the area, RSSI relating to a position $L_i$ (i is a freely-selected natural number) of the communication terminal device 20 and a position $L^{APk}$ of the access point $AP_k$ (k is an integer being any one of 1 to 3) in the analysis target area can be calculated by using Expression 1 and Expression 2.

$$RSSI(L^{APk}, L_i) = LOS(f, d(L^{APk}, L_i)) \quad \text{(Expression 1)}$$

$$LOS(f, d) = 20 \log_{10} f + N \log_{10} d - 28 \quad \text{(Expression 2)}$$

Note that, in Expression 1 and Expression 2, "LOS" indicates an estimation expression of a loss characteristic relating to signal transmission in an environment where no obstacle that affects the wireless communication state is present, and is given as in Expression 2 in line with International Telecommunication Union (ITU)-R Recommendations, for example. Further, in Expression 1 and Expression 2, f indicates a signal frequency of the wireless communication, d indicates a function for deriving a distance between one of $AP_1$ to $AP_3$ and the communication terminal device 20, and N indicates an attenuation coefficient. Further, $\log_{10}$ in Expression 2 indicates a logarithm (common logarithm) having 10 as a base.

Figure 4:
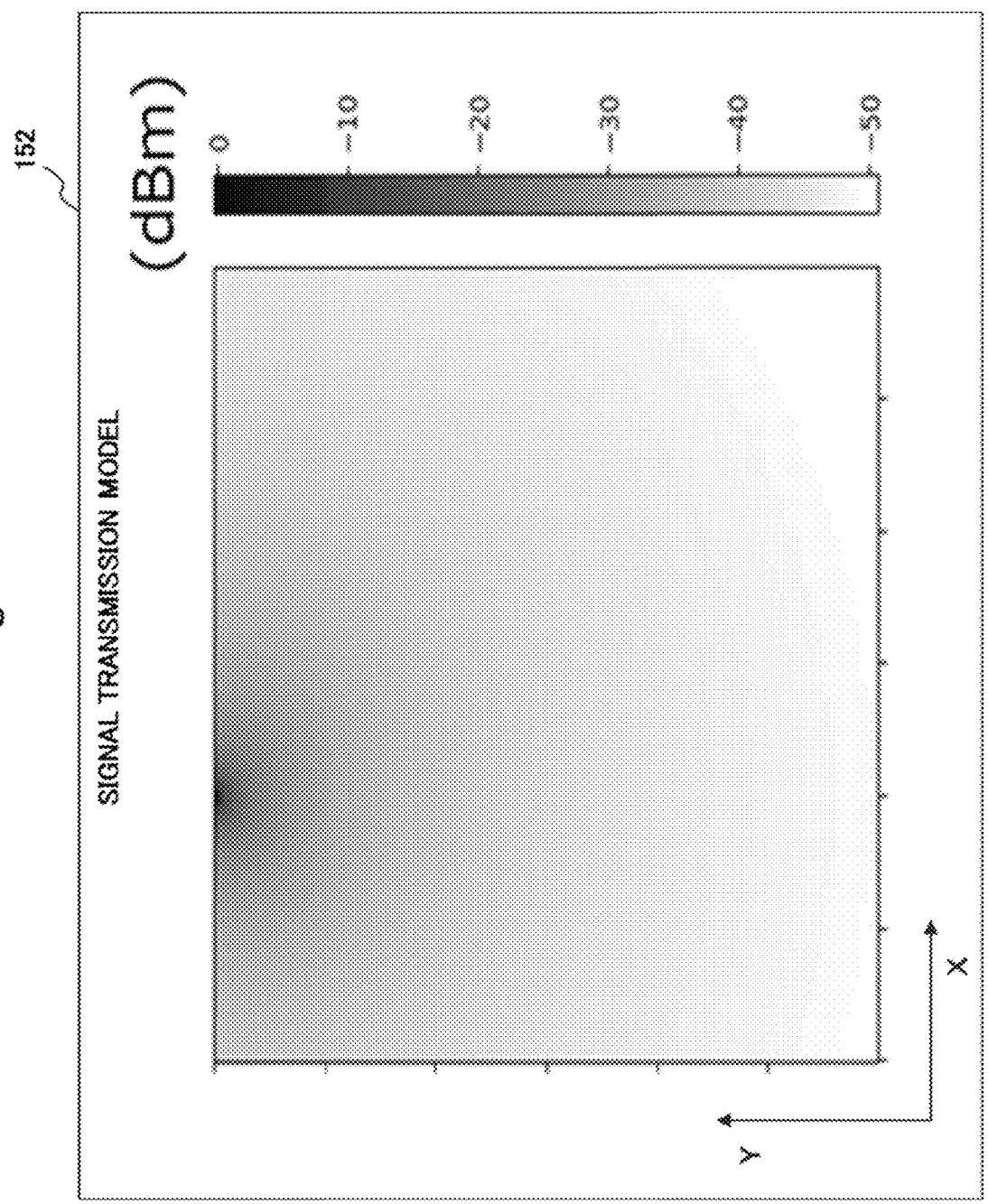
FIG. 4 is a diagram exemplifying, in a graph, an initial value of a signal transmission model 152 relating to $AP_1$ according to the first example embodiment of the present invention.
Figure 5:
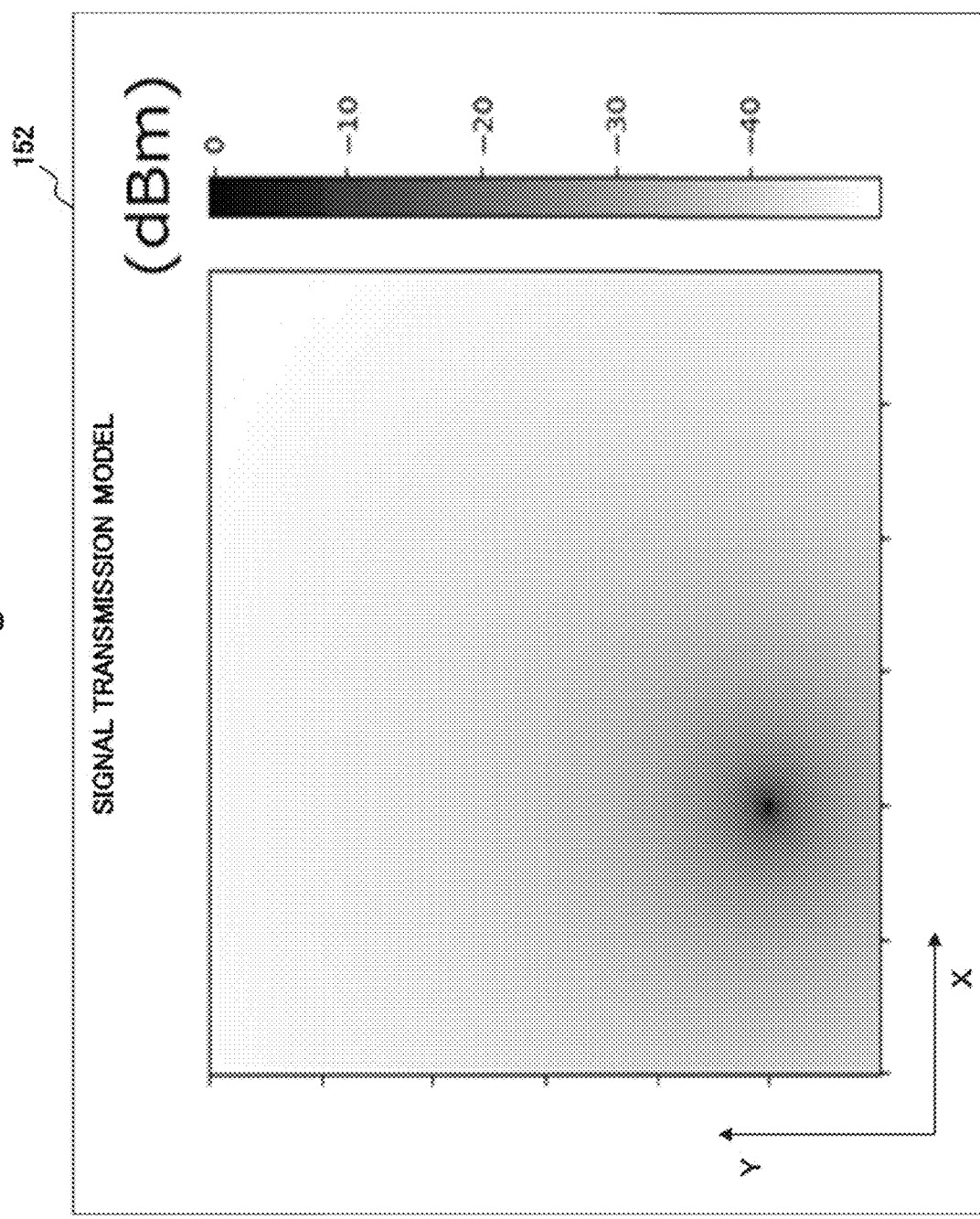
FIG. 5 is a diagram exemplifying, in a graph, an initial value of the signal transmission model 152 relating to $AP_2$ according to the first example embodiment of the present invention.
Figure 6:
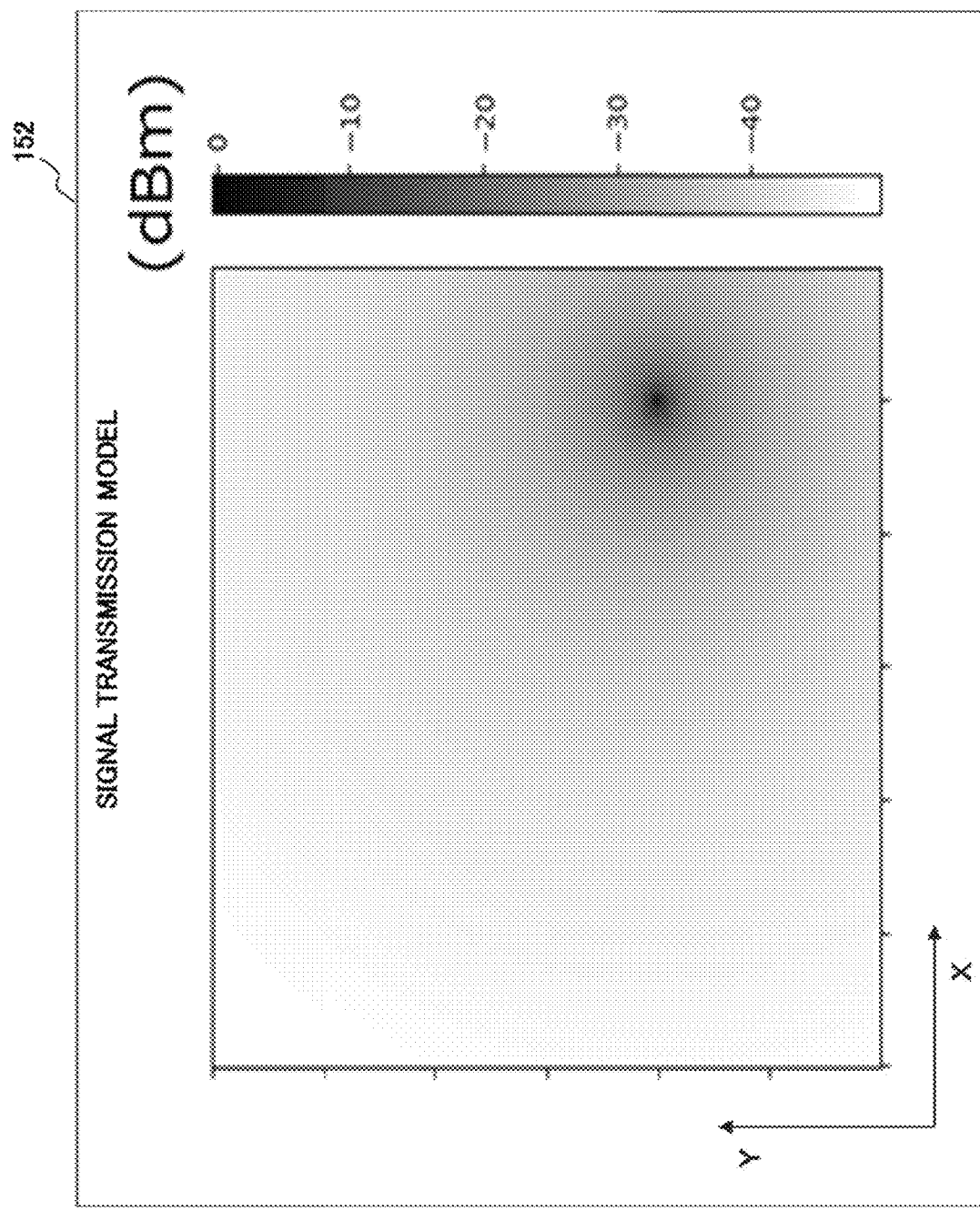
FIG. 6 is a diagram exemplifying, in a graph, an initial value of the signal transmission model 152 relating to $AP_3$ according to the first example embodiment of the present invention.

FIGS. 4 to 6 are diagrams exemplifying, in graphs each showing a signal strength map, the initial values of the signal transmission model 152 relating to $AP_1$ to $AP_3$ sequentially, which are generated by the estimation unit 11 (specifically, the signal transmission model generated by assuming that no obstacle is present). In the signal transmission model 152 exemplified in FIGS. 4 to 6, a paler (whiter) color indicates a larger attenuation amount during transmission of a signal. Specifically, in the signal transmission model 152 exemplified in FIGS. 4 to 6, parts with the darkest (black) color indicate places where $AP_1$ to $AP_3$ are installed, sequentially.

Based on the calculated signal transmission model 152 and the measurement result 151, the estimation unit 11 can estimate a position of the communication terminal device 20 for each elapsed time after the communication terminal device 20 starts movement, by using, for example, the Finger Print method being a publicly known method or the like. By using the Finger Print method, the estimation unit 11 estimates a position of the communication terminal device 20 for each elapsed time after the communication terminal device 20 starts movement, as demonstrated in Expression 3, for example.

$$\operatorname{argmin}_{L_i} \sum_{k=1}^{3} (RSSI_m^k - RSSI(L^{APk}, L_i))^2 \quad \text{(Expression 3)}$$

Note that, in Expression 3, m is a natural number indicating a chronological order relating to an elapsed time after the communication terminal device 20 starts movement (an order in which measurement is performed). Further, in the measurement result 151 exemplified in FIG. 3, $RSSI_m^k$ indicates an $m^{th}$ measurement value of RSSI relating to $AP_k$ after the communication terminal device 20 starts movement.

Further, in Expression 3, argmin indicates that the position $L_i$ of the communication terminal device 20 is derived in such a way that a value indicated with the numerical expression following $\Sigma$ is minimized. Specifically, the estimation unit 11 specifies the position $L_i$ of minimizing a value derived by squaring RSSI differences (errors) between the measurement result 151 and the signal transmission model 152 with respect to $AP_1$ to $AP_3$ and summing up the resultants.

Figure 7:
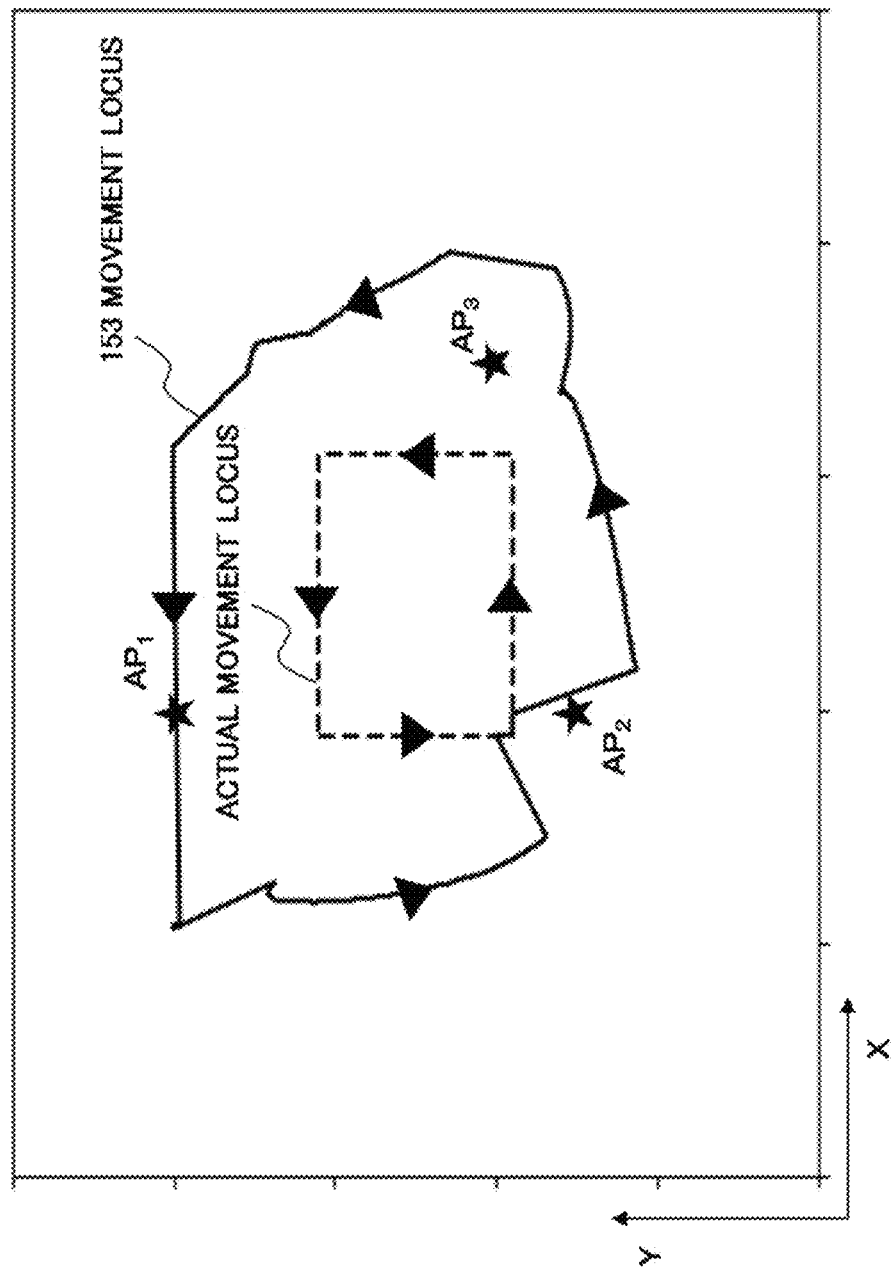
FIG. 7 is a diagram exemplifying a movement locus 153 estimated by an estimation unit 11 in first processing among repeated processing executed by the wireless communication failure analysis device 10 according to the first example embodiment of the present invention.

The estimation unit 11 estimates the movement locus 153 by connecting the specified positions $L_i$ with a line for all the values of m. FIG. 7 is a diagram exemplifying the movement locus 153 estimated by the estimation unit 11 in first processing among repeated processing executed by the wireless communication failure analysis device 10 according to the present example embodiment, which will be described later. As illustrated in FIG. 7, at the time point in the first processing, it can be understood that a difference between the movement locus 153 estimated by the estimation unit 11 and the actual movement locus is large.

Based on the restriction information 154 indicating a restriction (limitation) content relating to movement of the communication terminal device 20, the correction unit 12 illustrated in FIG. 1 corrects the movement locus 153 estimated by the estimation unit 11 in such a way as to satisfy the restriction content indicated in the restriction information 154. For example, it is assumed that the restriction information 154 according to the present example embodiment indicates a maximum speed relating to movement of the communication terminal device 20. Note that the restriction content relating to movement of the communication terminal device 20, which is indicated in the restriction information 154, is not limited to a maximum speed, and may be maximum acceleration or the like, for example.

In the present example embodiment, for example, it is assumed that the actual maximum speed at which the communication terminal device 20 moves is 1 meter per second (m/s). Further, in the first processing among the repeated processing executed by the wireless communication failure analysis device 10, which will be described later, the control unit 14 to be described later sets the maximum speed indicated in the restriction information 154 to be, for example, 3 m/s that is higher than the actual maximum speed, as an initial value.

Figure 8:
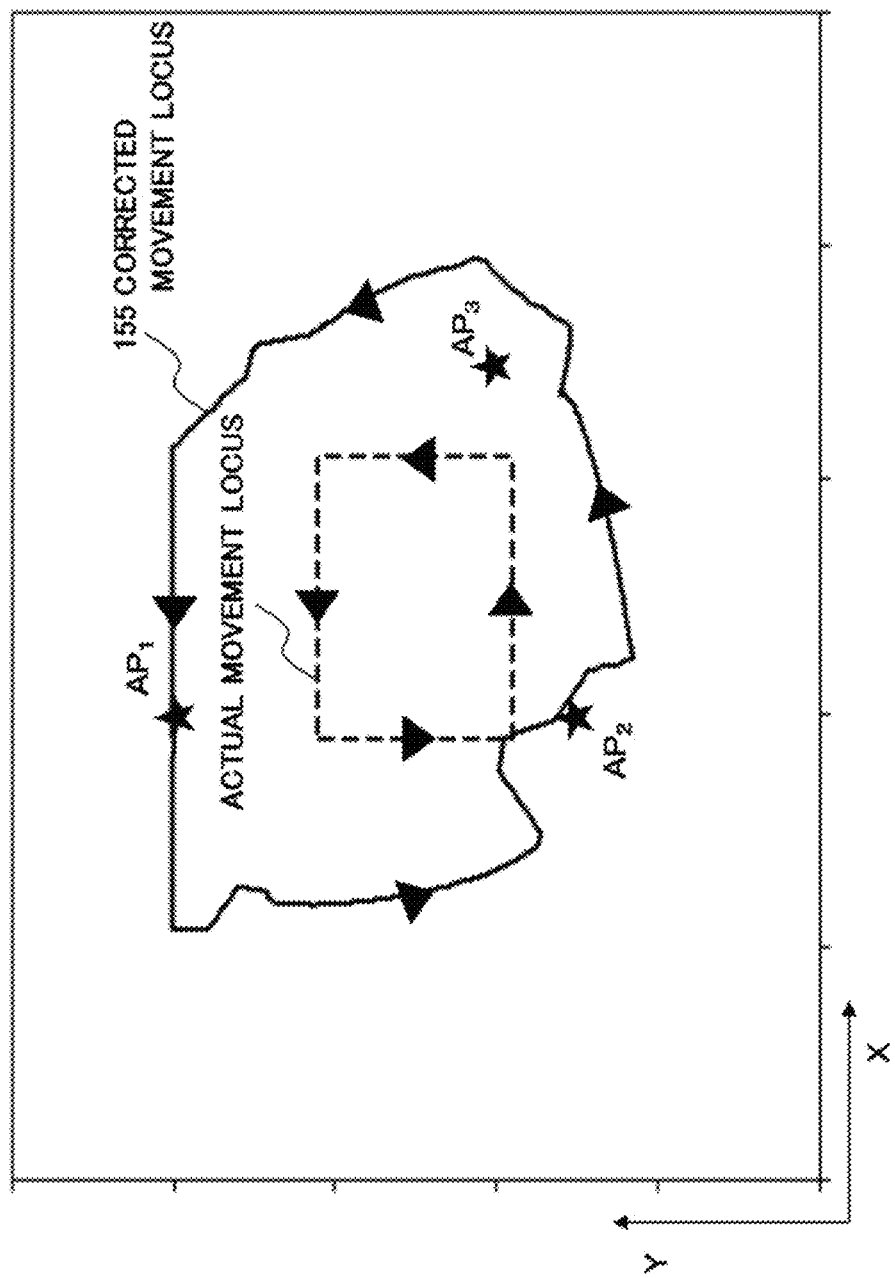
FIG. 8 is a diagram exemplifying, in a graph, a corrected movement locus 155 generated by a correction unit 12 in the first processing among the repeated processing executed by the wireless communication failure analysis device 10 according to the first example embodiment of the present invention.

Further, the correction unit 12 generates the corrected movement locus 155 by correcting the movement locus 153 estimated by the estimation unit 11, in such a way as to satisfy that the maximum speed at which the communication terminal device 20 moves is 3 m/s. For example, the correction unit 12 can correct the movement locus 153 described above by solving a linear scheduling question with a limitation for minimizing the distance (error) from the movement locus 153. FIG. 8 is a diagram exemplifying the corrected movement locus 155 generated by the correction unit 12 in the first processing among the repeated processing executed by the wireless communication failure analysis device 10 according to the present example embodiment, which will be described later. Specifically, the corrected movement locus 155 exemplified in FIG. 8 is a locus that satisfies that the maximum speed at which the communication terminal device 20 moves is 3 m/s.

Based on the corrected movement locus 155 generated by the correction unit 12 and the measurement result 151, the generation unit 13 exemplified in FIG. 1 estimates a presence situation of an obstacle that affects a communication state between $AP_1$ to $AP_3$ and the communication terminal device 20, and generates the obstacle estimation result 156 being an estimation result. For example, the generation unit 13 uses Expression 4, and hence estimates a presence situation of an obstacle.

Note that, in Expression 4, $L_m^{STA}$ indicates a position (coordinate) of the communication terminal device 20 in the corrected movement locus 155 when the $m^{th}$ RSSI is measured after the communication terminal device 20 starts movement. "Set" is a function for deriving a set of positions (coordinates) of points dividing a line connecting a position $L^{AP_k}$ and a position $L_m^{STA}$ at a predetermined interval. j indicates any of one or more positions derived with the function "Set". Grid(j) is a function for deriving an identifier of a region including a position j when the analysis target area for the wireless communication failure analysis device 10 includes a plurality of regions. X is a variable indicating a degree at which a signal of the wireless communication is affected (attenuated) by the obstacle in the region specified by Grid(j).

The generation unit 13 derives the variable value $X_{Grid(j)}$ in simultaneous equations expressed in Expression 4 relating to k (k is any of 1 to 3 in the present example embodiment) and all the values for m by using a method such as a least-squares method, and thus estimates a presence situation of an obstacle.

Figure 9:
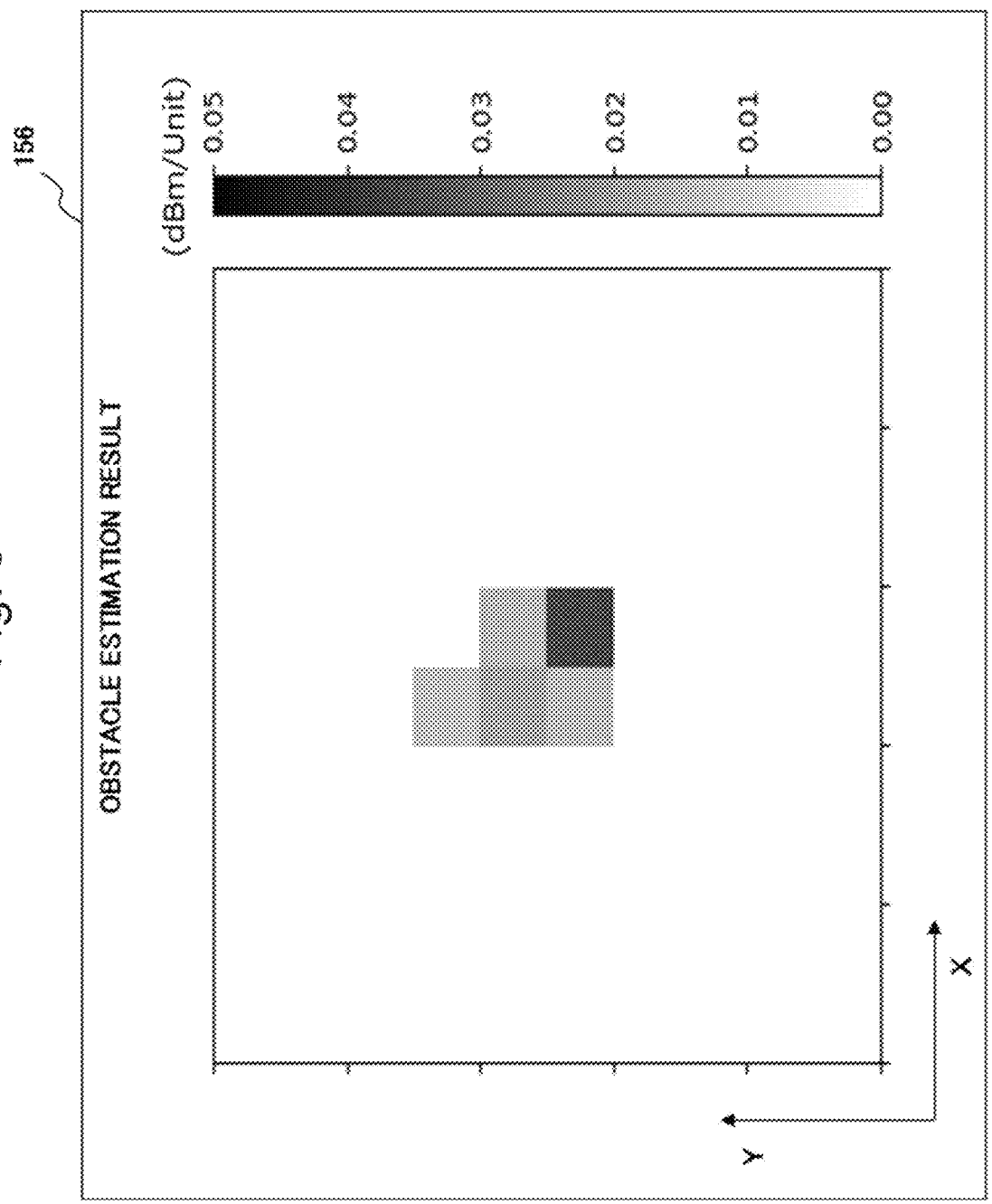
FIG. 9 is a diagram exemplifying, in a graph, an obstacle estimation result 156 generated by a generation unit 13 in the first processing among the repeated processing executed by the wireless communication failure analysis device 10 according to the first example embodiment of the present invention.

FIG. 9 is a diagram exemplifying, in a graph, the obstacle estimation result 156 generated by the generation unit 13 in the first processing among the repeated processing executed by the wireless communication failure analysis device 10 according to the example embodiment, which will be described later. In the obstacle estimation result 156 exemplified in FIG. 9, with respect to a certain region, a darker (blacker) color indicates a larger degree at which a signal of the wireless communication is attenuated by the obstacle.

The control unit 14 illustrated in FIG. 1 generates (updates) the restriction information 154 in such a way as to gradually strengthen (limit) the restriction content relating to movement of the communication terminal device 20 until the restriction information 154 satisfies a condition. Along with this, the control unit 14 executes control in such a way that estimation of the movement locus 153, which is executed by the estimation unit 11, generation of the corrected movement locus 155, which is executed by the correction unit 12, based on the generated restriction information 154, and generation of the obstacle estimation result 156 executed by the generation unit 13 are executed repeatedly (specifically, the wireless communication failure analysis device 10 executes the repeated processing).

At each time of executing the processing in the repeated processing described above, the control unit 14 according to the present example embodiment updates the maximum speed indicating the restriction content relating to movement of the communication terminal device 20 in such a way that the maximum speed is gradually reduced from the initial value. Here, as the maximum speed relating to movement of the communication terminal device 20 is higher, the range, which matches with the measurement result 151 exemplified in FIG. 3 and may include the estimated movement locus, is wider.

Specifically, in other words, as the maximum speed relating to movement of the communication terminal device 20 is lower, the range, which matches with the measurement result 151 exemplified in FIG. 3 and may include the estimated movement locus, is limited more. Therefore, with respect to the restriction information 154 of the present example embodiment, gradual reduction of the maximum speed relating to movement of the communication terminal device 20 indicates gradual strengthening of the restriction content relating to movement of the communication terminal device 20.

In the present example embodiment, as described above, it is assumed that, in the actual movement locus exemplified in FIG. 2, the actual maximum speed at which the communication terminal device 20 moves is, for example, 1 m/s, and it is assumed that the initial value of the maximum speed, which is set by the control unit 14, is, for example, 3 m/s. Further, it is assumed that the control unit 14 updates a value derived by subtracting 0.2 m/s from the maximum speed at every processing in the repeated processing, and the control unit 14 controls the estimation unit 11, the correction unit 12, and the generation unit 13 in such a way as to execute the repeated processing described above until the maximum speed is updated to 1 m/s being the actual maximum speed. Specifically, in this case, the control unit 14 sets a maximum speed in the first processing among the repeated processing to be 3 m/s, sets a maximum speed in second processing to be 2.8 m/s, and sets a maximum speed in eleventh processing to be 1 m/s. Further, the control unit 14 controls the estimation unit 11, the correction unit 12, and the generation unit 13 in such a way as to terminate the repeated processing when the eleventh processing is terminated.

Figure 10:
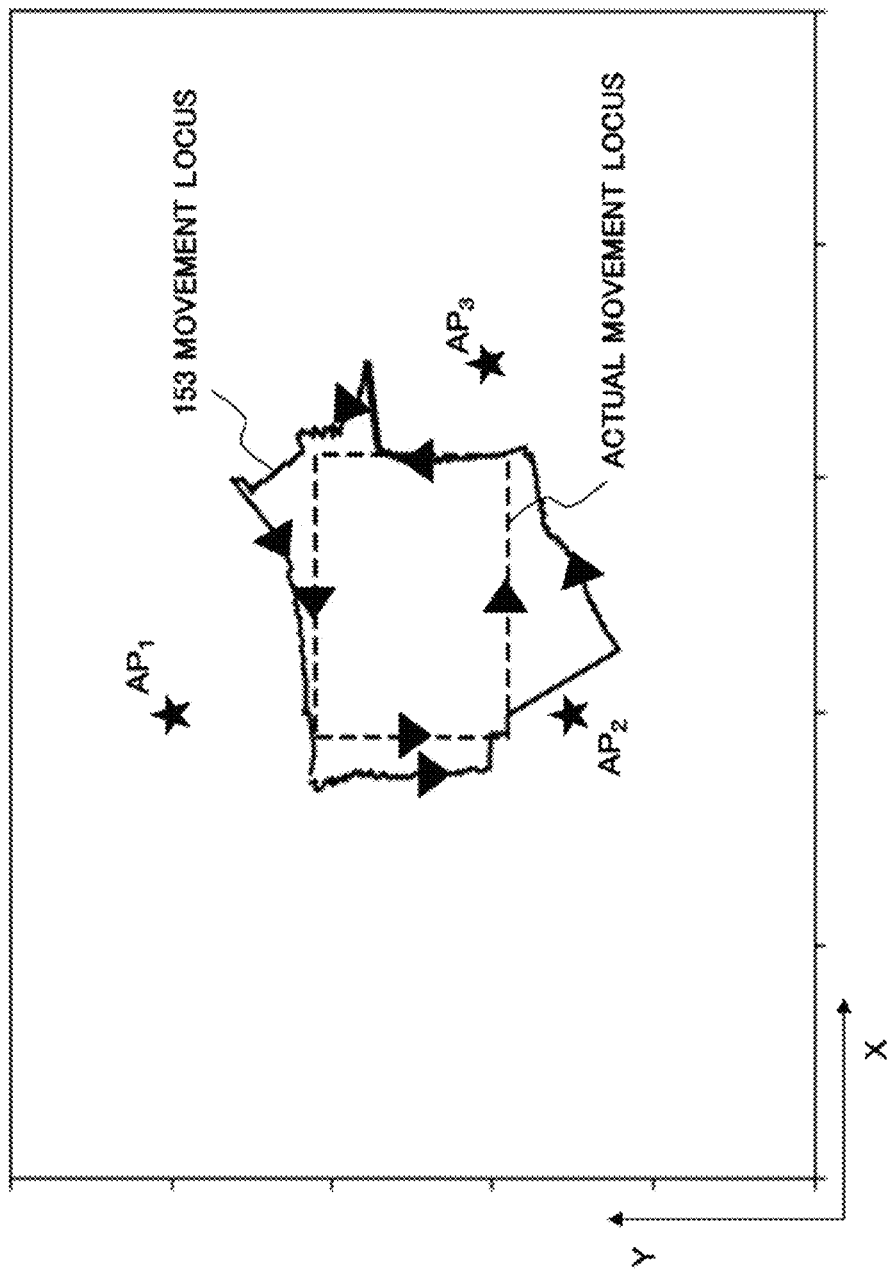
FIG. 10 is a diagram exemplifying the movement locus 153 estimated by the estimation unit 11 in fifth processing among the repeated processing executed by the wireless communication failure analysis device 10 according to the first example embodiment of the present invention.
Figure 11:
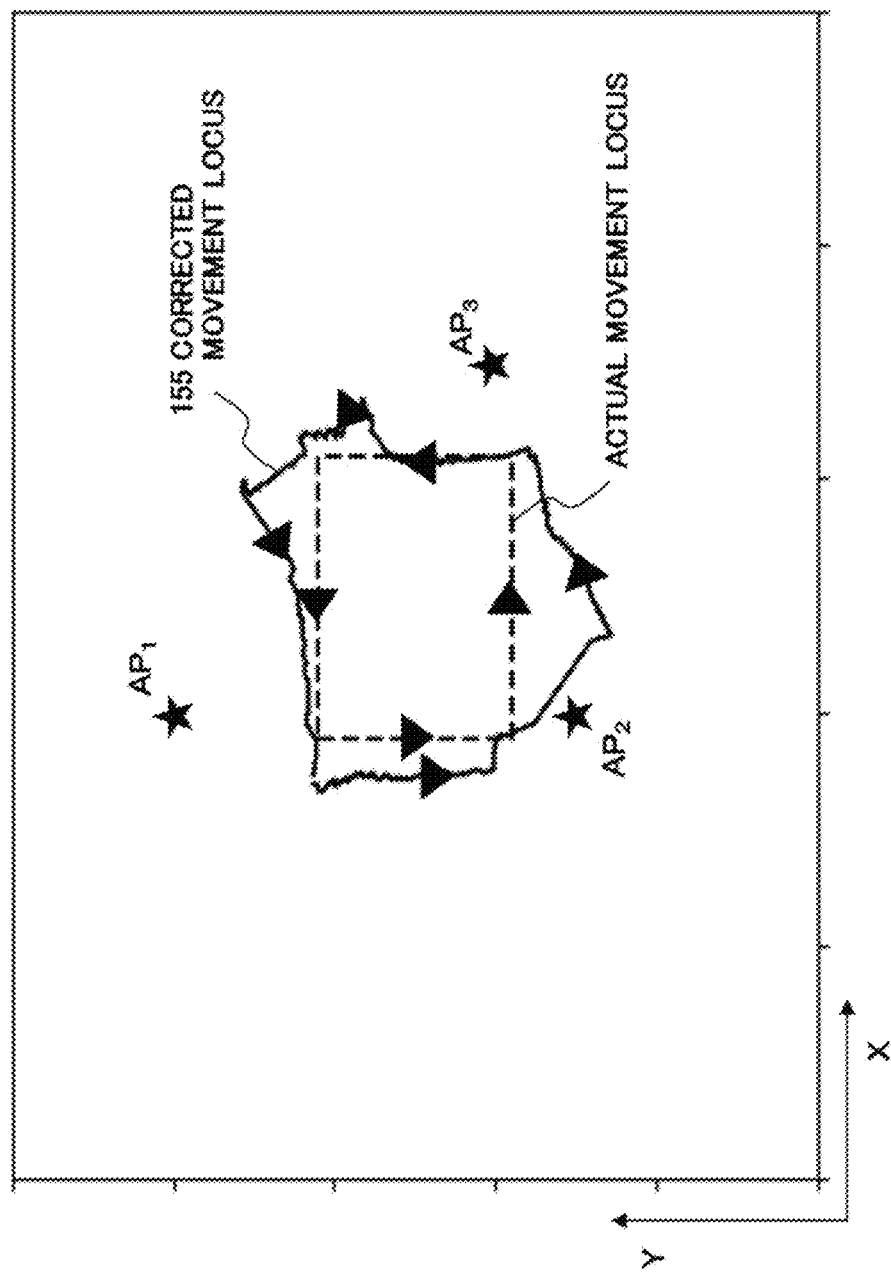
FIG. 11 is a diagram exemplifying, in a graph, the corrected movement locus 155 generated by the correction unit 12 in the fifth processing among the repeated processing executed by the wireless communication failure analysis device 10 according to the first example embodiment of the present invention.

FIG. 10 is a diagram exemplifying the movement locus 153 estimated by the estimation unit 11 in fifth processing among the repeated processing executed by the wireless communication failure analysis device 10 according to the present example embodiment. FIG. 11 is a diagram exemplifying the corrected movement locus 155 generated by the correction unit 12 in the fifth processing. According to FIGS. 10 and 11, and FIGS. 7 and 8, the movement locus 153 and the corrected movement locus 155 in the fifth processing has a difference (error) from the actual movement locus that is significantly reduced, as compared to the movement locus 153 and the corrected movement locus 155 in the first processing.

Figure 12:
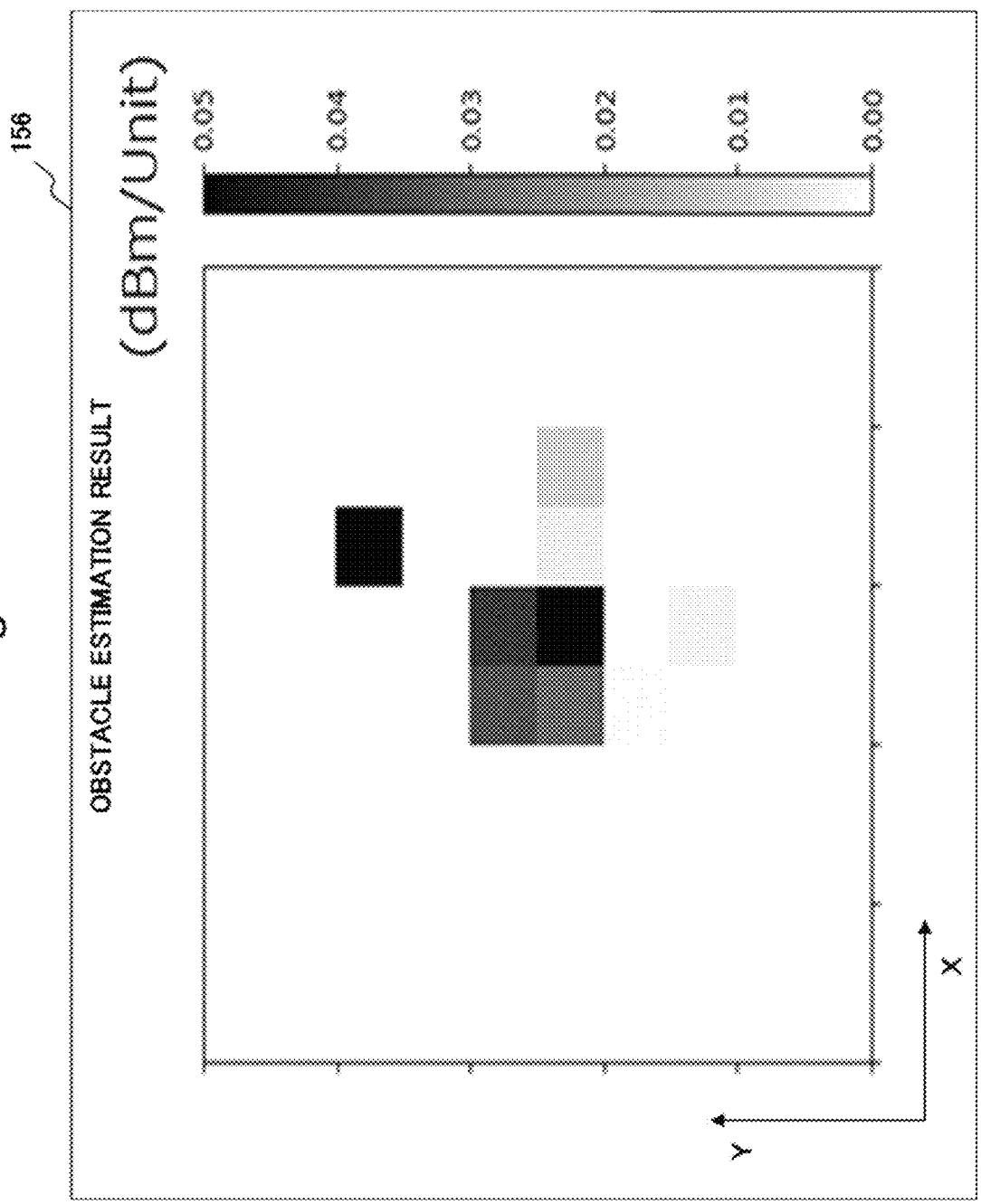
FIG. 12 is a diagram exemplifying, in a graph, the obstacle estimation result 156 generated by the generation unit 13 in the fifth processing among the repeated processing executed by the wireless communication failure analysis device 10 according to the first example embodiment of the present invention.

FIG. 12 is a diagram exemplifying, in a graph, the obstacle estimation result 156 generated by the generation unit 13 in the fifth processing. According to FIGS. 12 and 9, the obstacle estimation result 156 in the fifth processing indicates that the obstacle largely affects the communication state in a part of the region where the obstacle exemplified in FIG. 2 is actually present, as compared to the obstacle estimation result 156 in the first processing.

Figure 13:
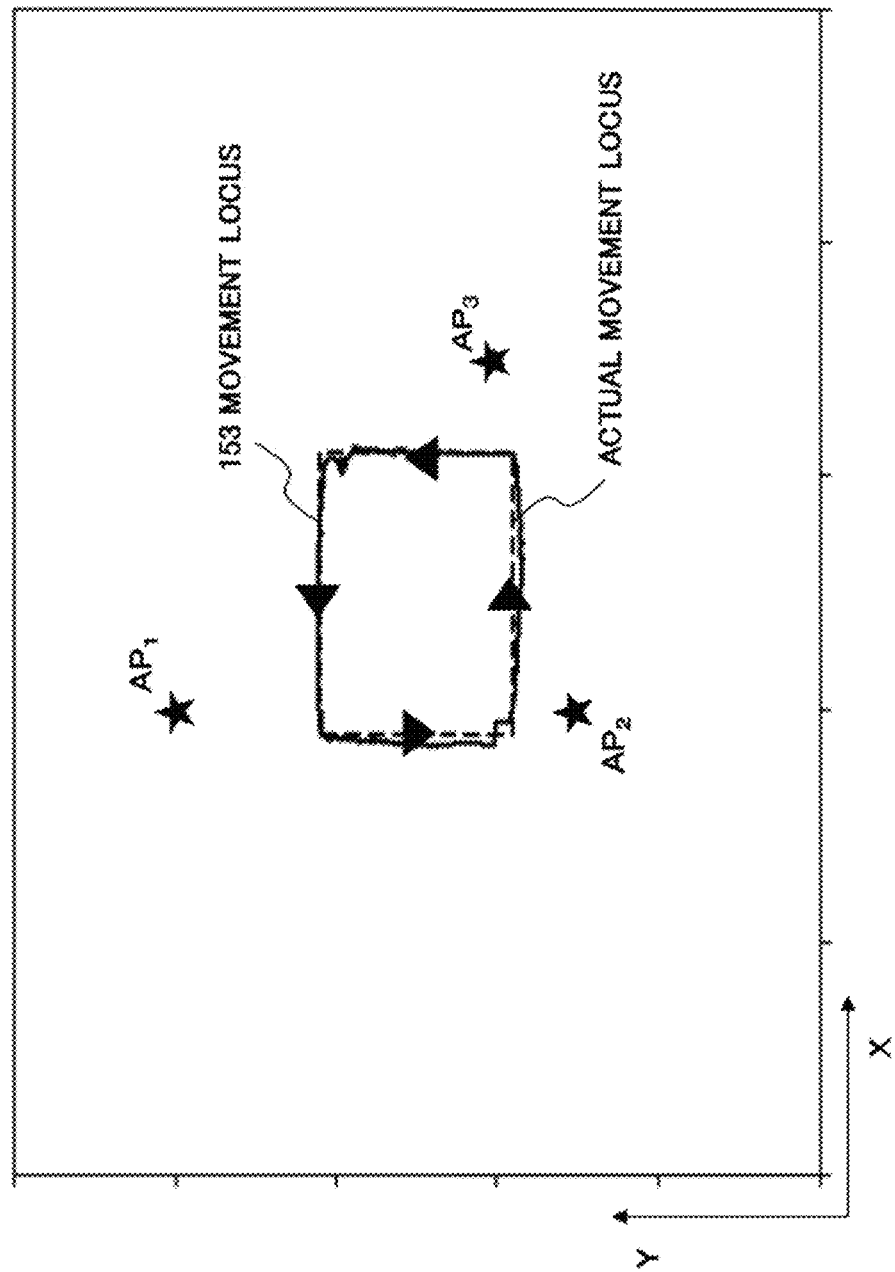
FIG. 13 is a diagram exemplifying the movement locus 153 estimated finally by the estimation unit 11 in the repeated processing executed by the wireless communication failure analysis device 10 according to the first example embodiment of the present invention.
Figure 14:
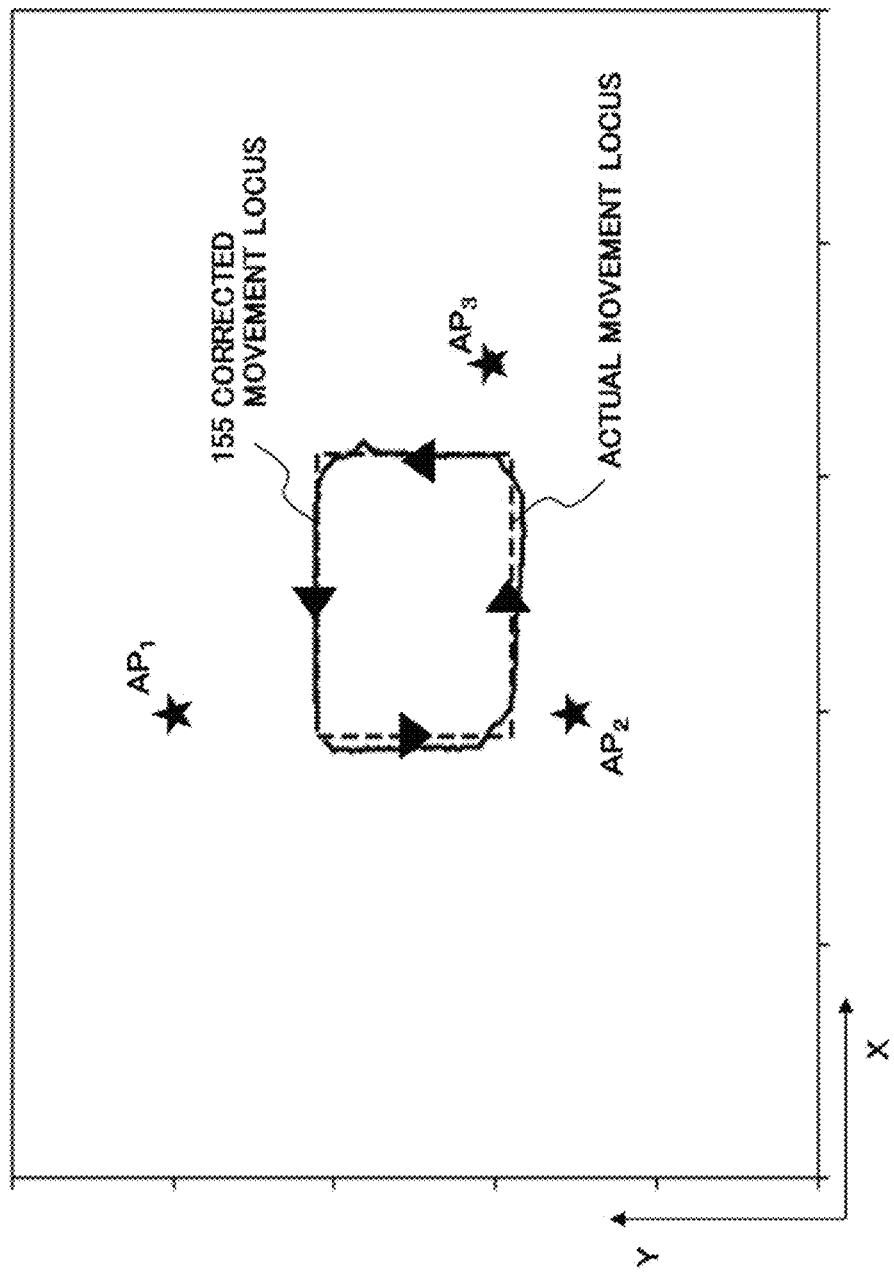
FIG. 14 is a diagram exemplifying the corrected movement locus 155 generated finally by the correction unit 12 in the repeated processing executed by the wireless communication failure analysis device 10 according to the first example embodiment of the present invention.

FIG. 13 is a diagram exemplifying the movement locus 153 estimated finally by the estimation unit 11 in the eleventh processing among the repeated processing executed by the wireless communication failure analysis device 10 according to the present example embodiment. FIG. 14 is a diagram exemplifying the corrected movement locus 155 generated finally by the correction unit 12 in the eleventh processing. According to FIGS. 13 and 14, and FIGS. 10 and 11, the movement locus 153 and the corrected movement locus 155 in the eleventh processing has a further reduced difference (error) from the actual movement locus, and substantially matches with the actual movement locus, as compared to the movement locus 153 and the corrected movement locus 155 in the fifth processing.

Figure 15:
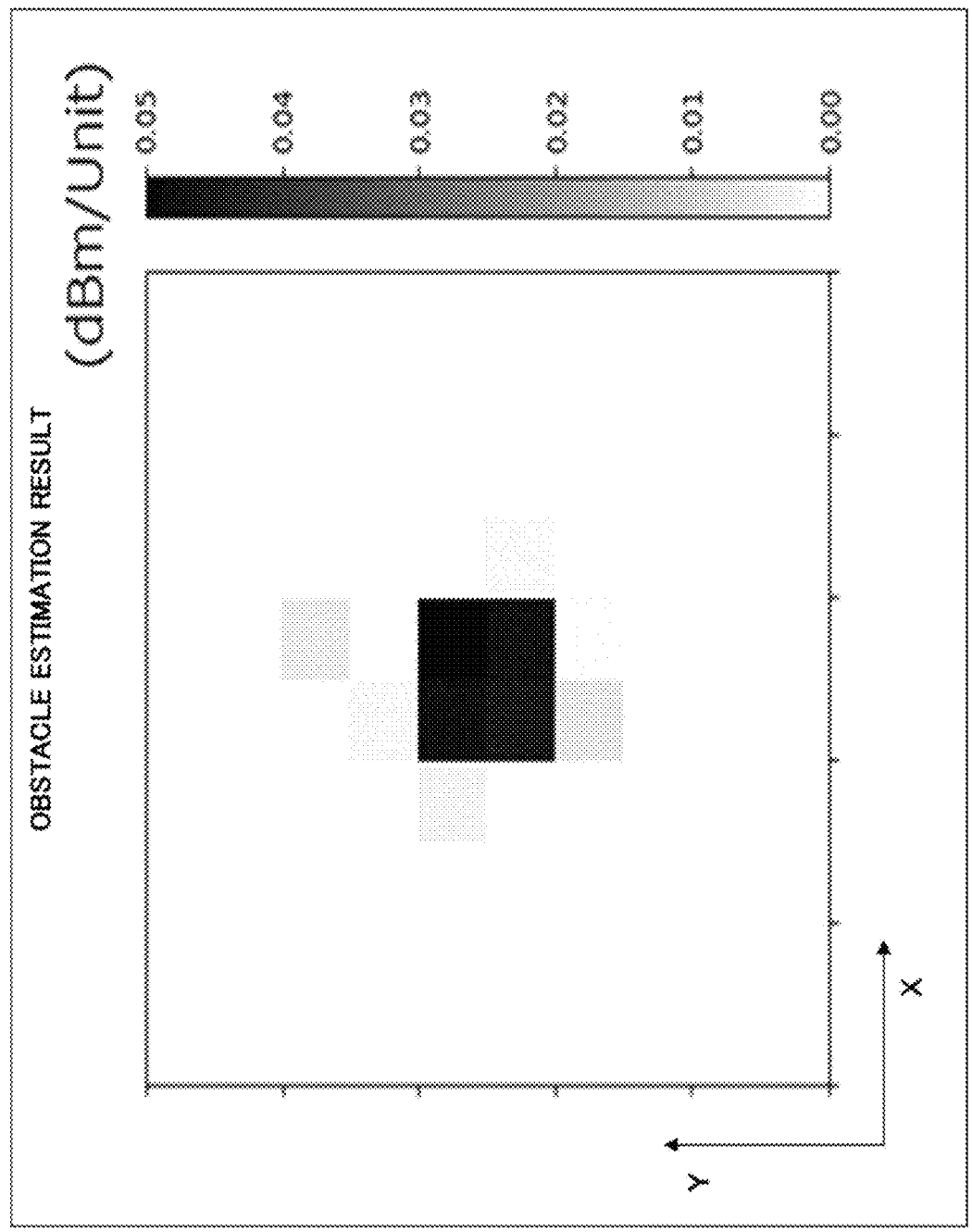
FIG. 15 is a diagram exemplifying, in a graph, the obstacle estimation result 156 generated finally by the generation unit 13 in the repeated processing executed by the wireless communication failure analysis device 10 according to the first example embodiment of the present invention.

FIG. 15 is a diagram exemplifying, in a graph, the obstacle estimation result 156 generated finally by the generation unit 13 in the eleventh processing. According to FIGS. 15 and 12, in the obstacle estimation result 156 in the eleventh processing, the estimation content is corrected with respect to the region indicated in the obstacle estimation result 156 in the fifth processing where the obstacle is estimated to be present although the obstacle is not actually present. Specifically, the obstacle estimation result 156 in the eleventh processing indicates a presence situation of the obstacle that is more accurately estimated, as compared to the obstacle estimation result 156 in the fifth processing.

The control unit 14 outputs the corrected movement locus 155 generated finally by the correction unit 12, which is exemplified in FIG. 14, and the obstacle estimation result 156 generated finally by the generation unit 13, which is exemplified in FIG. 15, to the management terminal device 30 (external device), for example. With this, a user is allowed to confirm the corrected movement locus 155 and the obstacle estimation result 156 that are generated finally by the wireless communication failure analysis device 10, via a display screen or the like included in the management terminal device 30.

Figure 16:
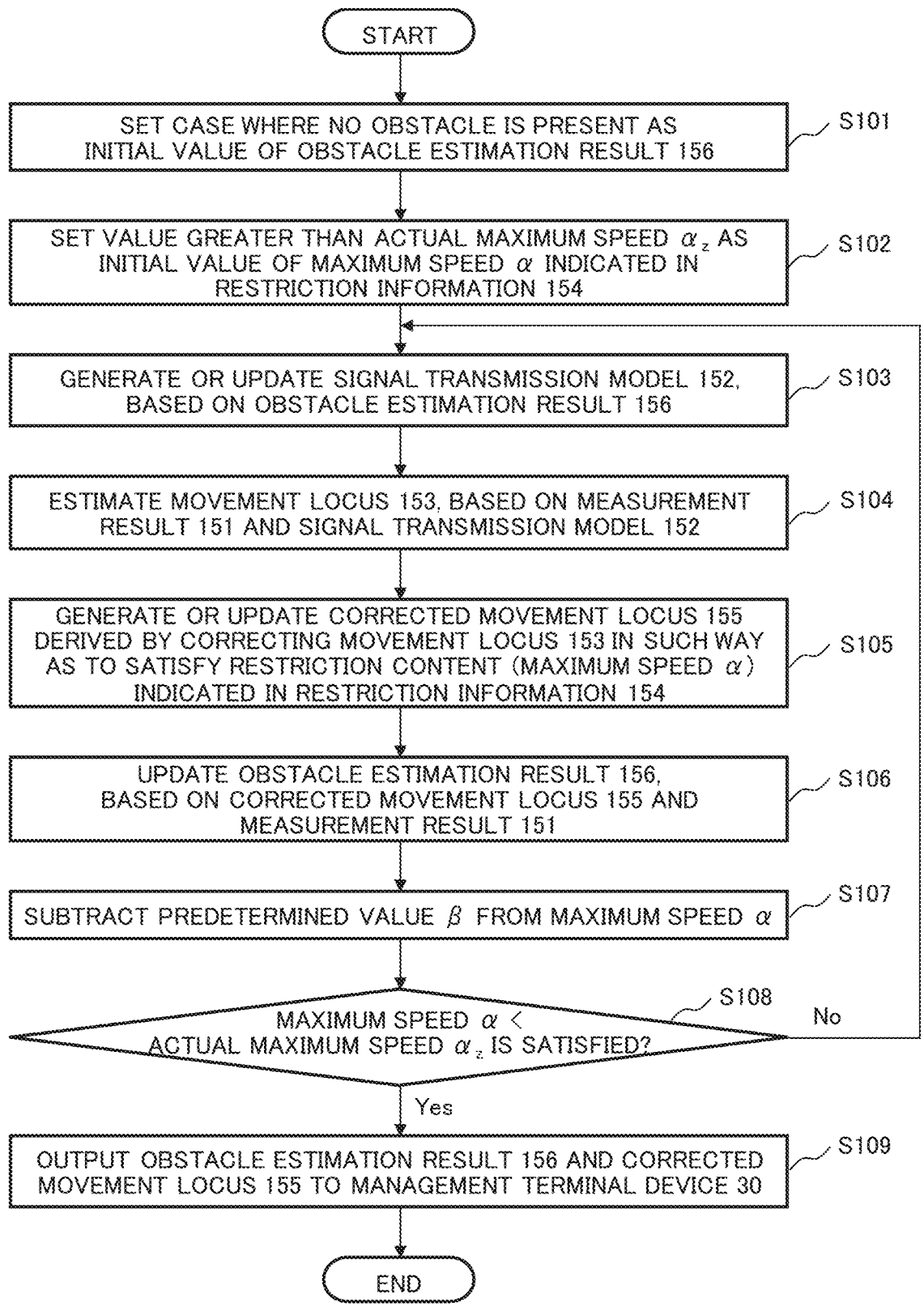
FIG. 16 is a flowchart illustrating an operation of the wireless communication failure analysis device 10 according to the first example embodiment of the present invention.

Next, with reference to a flowchart of FIG. 16, an operation (processing) of the wireless communication failure analysis device 10 according to the present example embodiment is described in detail.

The estimation unit 11 sets, as the initial value of the obstacle estimation result 156, that there is no obstacle that affects the wireless communication environment between the communication terminal device 20 and $AP_1$ to $AP_3$ (Step S101). The control unit 14 sets a value (for example, 3 m/s), which is greater than an actual maximum speed $\alpha_z$ (for example, 1 m/s), as an initial value of a maximum speed $\alpha$ relating to movement of the communication terminal device 20, which is indicated in the restriction information 154 (Step S102).

The estimation unit 11 generates or updates the signal transmission model 152, based on the obstacle estimation result 156 (Step S103). The estimation unit 11 estimates the movement locus 153, based on the measurement result 151 and the signal transmission model 152 (Step S104). The correction unit 12 generates or updates the corrected movement locus 155 derived by correcting the movement locus 153 in such a way as to satisfy the restriction content (the maximum speed $\alpha$) indicated in the restriction information 154 (Step S105).

The generation unit 13 updates the obstacle estimation result 156, based on the corrected movement locus 155 and the measurement result 151 (Step S106). The control unit 14 subtracts a predetermined value $\beta$ (for example, 0.2 m/s) from the maximum speed $\alpha$ (Step S107).

When the maximum speed $\alpha$ is equal to or higher than the actual maximum speed $\alpha_z$ (No in Step S108), the processing returns to Step S103 under control of the control unit 14. When the maximum speed $\alpha$ is lower than the actual maximum speed $\alpha_z$ (Yes in Step S108), the control unit 14 outputs the obstacle estimation result 156 and the corrected movement locus 155 to the management terminal device 30 (Step S109), and the whole processing is terminated.

The wireless communication failure analysis device according to the present example embodiment is capable of analyzing a presence situation of an obstacle that affects the wireless communication state efficiently and with high accuracy. The reason for this is because the wireless communication failure analysis device according to the present example embodiment repeatedly executes the operations of estimating the movement locus of the wireless terminal device, based on the measurement result of the communication state and the estimation result relating to the presence situation of the obstacle, correcting the movement locus, based on the restriction content relating to movement of the communication terminal device, and generating the estimation result, based on the corrected movement locus and the measurement result, while gradually strengthening the restriction content.

Effects achieved by the wireless communication failure analysis device 10 according to the present example embodiment are described in detail below.

For example, at a site where an environment relating to the wireless communication changes rapidly, it has been expected to establish a stable wireless communication environment more securely and efficiently. Further, when a suitable measure capable of improving a deteriorated wireless communication state is to be taken efficiently, there is a problem in analyzing a detailed cause for deteriorating the wireless communication state efficiently and with high accuracy, for example, analyzing whether the cause is attenuation of signal strength due to an obstacle present at a specific location, a long distance between a wireless terminal device and an access point being a communication destination, or the like.

In view of the problem, the wireless communication failure analysis device 10 according to the present example embodiment includes the estimation unit 11, the correction unit 12, the generation unit 13, and the control unit 14, and is operated as described above with reference to FIGS. 1 to 16. Specifically, the estimation unit 11 estimates the movement locus 153 of the communication terminal device communicable with the access points installed at the known positions, based on the measurement result 151 indicating the communication state between the access points and the communication terminal device 20, which changes along with movement of the communication terminal device 20, and based on the obstacle estimation result 156 relating to a presence situation of an obstacle that affects the communication state. The correction unit 12 corrects the movement locus 153, based on the restriction information 154 indicating the restriction content relating to movement of the communication terminal device 20. The generation unit 13 generates the estimation result 151, based on the corrected movement locus 155 and the measurement result 151. Further, the control unit 14 generates the restriction information 154 in such a way as to gradually strengthen the restriction content until the restriction content satisfies a condition, and executes control in such a way that estimation of the movement locus 153 by the estimation unit 11, correction of the movement locus 153 by the correction unit 12, based on the generated restriction information 154, and generation of the obstacle estimation result 156 by the generation unit 13 are repeatedly executed.

Specifically, when executing estimation of a presence situation of an obstacle that affects the wireless communication state and estimation of the movement locus 153 of the communication terminal device 20, which is required for the estimation of the presence situation of the obstacle, the wireless communication failure analysis device 10 according to the present example embodiment firstly starts estimation of the restriction content relating to movement of the communication terminal device 20, by using a more weakened (eased) value than the actual value, as exemplified in FIG. 8. Further, the wireless communication failure analysis device 10 updates the restriction content to a gradually strengthened (limited) value as exemplified in FIGS. 8, 11, and 14, and at the same time, repeatedly executes new estimation of the corrected movement locus 155 and the obstacle estimation result 156, based on the signal transmission model 152 based on the previously-derived obstacle estimation result 156, and the measurement result 151.

This indicates that estimation is started at low accuracy for preventing wrong estimation directivity, and then estimation accuracy is gradually increased. Further, because the wireless communication failure analysis device 10 executes the operations described above, the information provided for estimating a presence situation of an obstacle is only required to include the measurement result 151, the information indicating the positions at which the access points are installed, and limited information such as the restriction information 154. Therefore, the wireless communication failure analysis device 10 according to the present example embodiment is capable of analyzing a presence situation of an obstacle that affects the wireless communication state efficiently and with high accuracy.

Further, the control unit 14 of the present example embodiment sets, as a condition used for determining whether to terminate the above-mentioned repeated processing, the restriction content (for example, the maximum movement speed is 1 m/s) relating to movement of the communication terminal device 20 when the measurement result 151 is acquired. The control unit 14 sets, as the initial value of the restriction information 154, the restriction content (for example, the maximum movement speed is 3 m/s) which is weaker than the restriction content relating to movement of the communication terminal device 20 when the measurement result 151 is acquired. Further, the control unit 14 generates the restriction information 154 indicating the maximum speed or the maximum acceleration relating to movement of the communication terminal device 20, in such a way that the maximum speed or the maximum acceleration is gradually reduced. With this, the wireless communication failure analysis device 10 according to the present example embodiment is capable of easily executing analysis of a presence situation of an obstacle efficiently and with high accuracy.

Further, in the present example embodiment described above, the communication terminal device 20 includes the communication state measurement unit 21, but the communication state measurement unit 21 is only required to be included in at least any one of the communication terminal device 20 and the access points. Alternatively, the communication state measurement unit 21 may be a single device having a communication function (for example, a dedicated measurement device) installed in the vicinity of the access points.

Second Example Embodiment

Figure 17:
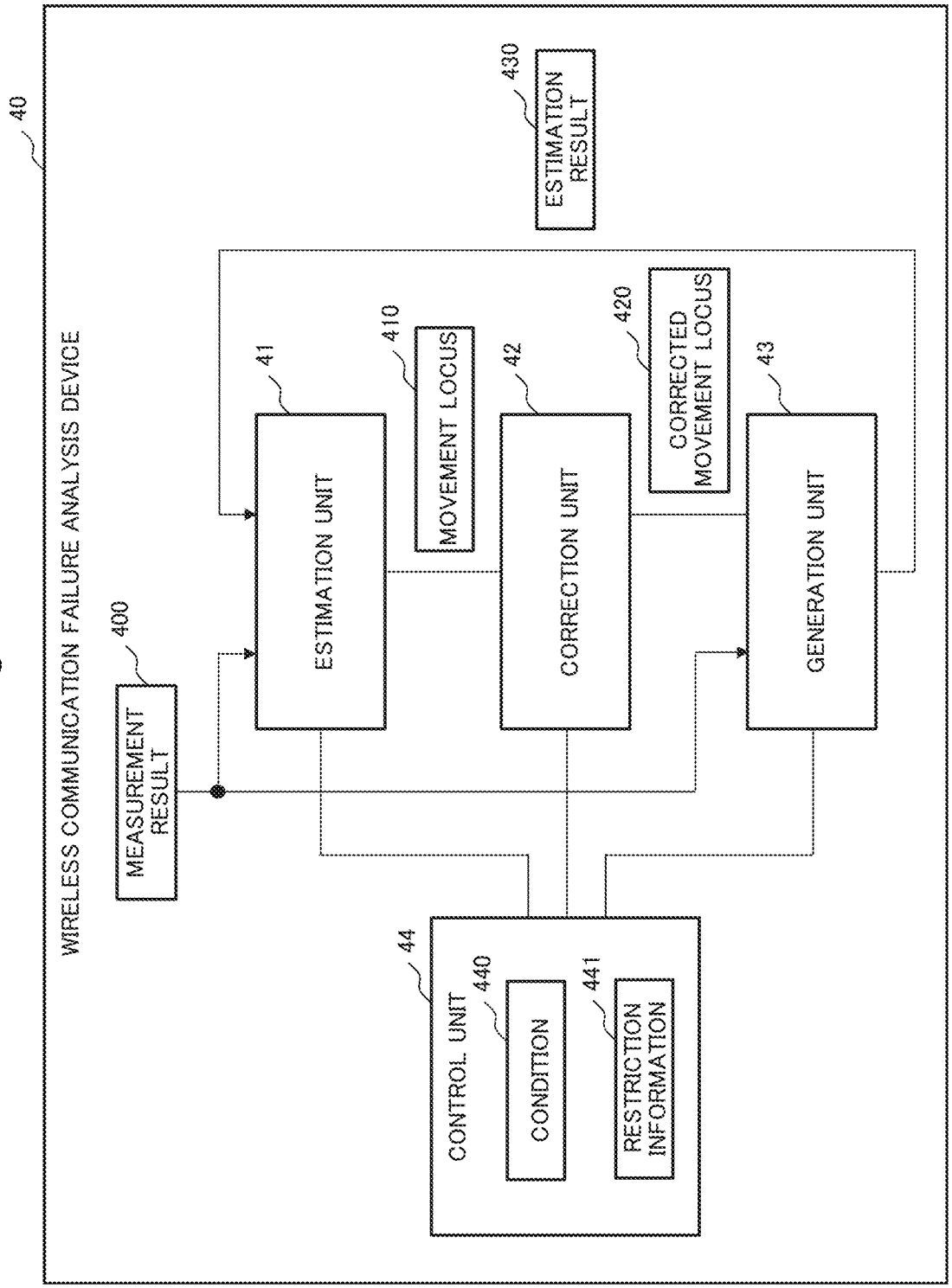
FIG. 17 is a block diagram illustrating a configuration of a wireless communication failure analysis device 40 according to a second example embodiment of the present invention.

FIG. 17 is a block diagram illustrating a configuration of a wireless communication failure analysis device 40 according to a second example embodiment of the present invention.

The wireless communication failure analysis device 40 according to the present example embodiment includes an estimation unit 41, a correction unit 42, a generation unit 43, and a control unit 44.

The estimation unit 41 estimates a movement locus 410 of a communication terminal device communicable with access points installed at known positions, based on a measurement result 400 indicating the communication state between the access points and the communication terminal device, which changes along with movement of the communication terminal device, and based on an estimation result 430 relating to a presence situation of an obstacle that affects the communication state.

The correction unit 42 corrects the movement locus 410, based on restriction information 441 indicating a restriction content relating to movement of the communication terminal device.

The generation unit 43 generates the estimation result 430, based on a corrected movement locus 420 and the measurement result 400.

The control unit 44 generates the restriction information 441 in such a way as to gradually strengthen the restriction content until the restriction content satisfies a condition 440, and executes control in such a way that estimation of the movement locus 410 by the estimation unit 41, correction of the movement locus 410 by the correction unit 42 based on the generated restriction information 441, and generation of the estimation result 430 by the generation unit 43 are repeatedly executed.

The wireless communication failure analysis device 40 according to the present example embodiment is capable of analyzing a presence situation of an obstacle that affects the wireless communication state efficiently and with high accuracy. The reason for this is because the wireless communication failure analysis device 40 repeatedly executes the operations of estimating the movement locus of the wireless terminal device, based on the estimation result relating to the measurement result of the communication state and the presence situation of the obstacle, correcting the movement locus, based on the restriction relating to movement of the communication terminal device, and generating the estimation result, based on the corrected movement locus and the measurement result, while gradually strengthening the restriction.

Hardware Configuration Example

In each of the example embodiments described above, each of the units in the wireless communication failure analysis device illustrated in FIGS. 1 and 17 can be achieved with a dedicated hardware (HW) (electronic circuit). Further, in FIGS. 1 and 17, at least each of the following configurations can be regarded as a function (processing) unit of a software program (software module):

the estimation units 11 and 41;
the correction units 12 and 42;
the generation units 13 and 43;
the control units 14 and 44; and
the storage control function in the storage unit 15.

Note that division of the units illustrated in the drawings is a configuration for convenience of the description, and various configurations can be conceived for implementation. One example of a hardware environment in this case is described with reference to FIG. 18.

FIG. 18 is a block diagram describing, as an example, a configuration of an information processing device 900 (computer) capable of executing the wireless communication failure analysis device according to each of the example embodiments of the present invention. Specifically, FIG. 18 illustrates a configuration of a computer (information processing device) capable of achieving the wireless communication failure analysis device illustrated in FIGS. 1 and 17, which is a hardware environment capable of achieving each function in the example embodiments described above.

As constituent elements, the information processing device 900 illustrated in FIG. 18 includes the following:

a central processing unit (CPU) 901;
a read-only memory (ROM) 902;
a random access memory (RAM) 903;
a hard disc (storage device) 904;
a communication interface 905;
a bus 906 (communication line);
a reader/writer 908 capable of reading and writing data stored in a recording medium 907 such as a compact disc read-only memory (CD-ROM); and
an input/output interface 909 such as a monitor, a speaker, and a keyboard.

Specifically, the information processing device 900 including the constituent elements described above is a commonly-used computer in which those elements are connected to one another via the bus 906. The information processing device 900 may include a plurality of CPUs 901, or may include the CPU 901 including a multi-core.

Further, the present invention described with the example embodiments described above as examples provides the information processing device 900 illustrated in FIG. 18 with a computer program capable of achieving the following functions. The functions are the above-mentioned configurations in the block configuration diagrams (FIGS. 1 and 17) referred to in the description of the example embodiments or the functions in the flowchart (FIG. 16). Then, the present invention is achieved by causing the CPU 901 of the hardware to read, interpret, and execute the computer program. Further, the computer program provided in the device may be stored in a readable/writable volatile memory (the RAM 903) or a non-volatile storage device such as the ROM 902 and the hard disk 904.

Further, in this case, as a method of providing the computer program in the hardware, a general procedure can be currently employed. For example, the procedure includes a method of installing the computer program in the device via the recording medium 907 of various types such as a CD-ROM, a method of downloading the computer program from the outside via a communication network such as the Internet, and the like. Further, in such a case, it can be regarded that the present invention is constituted of codes forming the computer program or the recording medium 907 in which the codes are stored.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Note that a part or an entirety of each of the example embodiments described above may be described as in the following supplementary notes. However, the present invention described as an example in each of the example embodiments described above is not limited to the following.

Supplementary Note 1

A wireless communication failure analysis device including:
an estimation means for estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state;
a correction means for correcting the movement locus, based on restriction information indicating a restriction relating to movement of the communication terminal device;
a generation means for generating the estimation result, based on the movement locus that is corrected and the measurement result; and
a control means for generating the restriction information in such a way as to gradually strengthen the restriction until the restriction satisfies a condition, and executing control in such a way that estimation of the movement locus by the estimation means, correction of the movement locus by the correction means based on the restriction information that is generated, and generation of the estimation result by the generation means are repeatedly performed.

Supplementary Note 2

The wireless communication failure analysis device according to Supplementary Note 1, wherein
the control means sets, as the condition, a restriction content relating to movement of the communication terminal device when the measurement result is acquired, and sets, as an initial value of the restriction information, a restriction content that is weaker than the restriction content relating to movement of the communication terminal device when the measurement result is acquired.

Supplementary Note 3

The wireless communication failure analysis device according to Supplementary Note 1 or 2, wherein
the control means generates the restriction information indicating a maximum speed or maximum acceleration relating to movement of the communication terminal device in such a way that the maximum speed or the maximum acceleration is gradually reduced.

Supplementary Note 4

The wireless communication failure analysis device according to any one of Supplementary Notes 1 to 3, wherein
the estimation means sets, as an initial value of the estimation result, that there is no obstacle that affects the communication state.

Supplementary Note 5

The wireless communication failure analysis device according to any one of Supplementary Notes 1 to 4, wherein
the estimation means estimates, as a position of the communication terminal device, a position at which a difference between a value indicating the measurement result and a value indicating the communication state that is estimated based on the estimation result becomes the smallest at each time point indicated in the measurement result.

Supplementary Note 6

The wireless communication failure analysis device according to any one of Supplementary Notes 1 to 5, wherein
the correction means generates, as the movement locus that is corrected, a movement locus having the smallest difference from the movement locus that is estimated by the estimation means among the movement locus satisfying the restriction that is indicated in the restriction information.

Supplementary Note 7

The wireless communication failure analysis device according to any one of Supplementary Notes 1 to 6, wherein
the estimation means generates a signal transmission model relating to communication between the access point and the communication terminal device, based on the estimation result, and
the generation means generates the estimation result in such a way that a difference between the signal transmission model and the measurement result assuming that the communication terminal device moves in the movement locus that is corrected by the correction means becomes the smallest.

Supplementary Note 8

The wireless communication failure analysis device according to any one of Supplementary Notes 1 to 7, wherein
the estimation means uses the measurement result indicating a received signal strength indicator, which is measured by at least any one of the access point, the communication terminal device, and a dedicated measurement device.

Supplementary Note 9

The wireless communication failure analysis device according to any one of Supplementary Notes 1 to 8, wherein
the control means outputs, to an external device, information indicating the movement locus and the estimation result that are generated based on the restriction information in which the restriction content satisfies the condition.

Supplementary Note 10

A wireless communication failure analysis system including:
the wireless communication failure analysis device according to any one of Supplementary Notes 1 to 9;
the communication terminal device; and
the access point.

Supplementary Note 11

A wireless communication failure analysis method being executed by an information processing device, the method including:
estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state;
correcting the movement locus, based on restriction information indicating a restriction relating to movement of the communication terminal device;
generating the estimation result, based on the movement locus that is corrected and the measurement result; and
generating the restriction information in such a way as to gradually strengthen the restriction until the restriction satisfies a condition, and executing control in such a way that estimation of the movement locus, correction of the movement locus based on the restriction information that is generated, and generation of the estimation result are repeatedly performed.

Supplementary Note 12

A recording medium that stores a wireless communication failure analysis program for causing a computer to execute:
estimation processing of estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state;
correction processing of correcting the movement locus, based on restriction information indicating a restriction relating to movement of the communication terminal device;
generation processing of generating the estimation result, based on the movement locus that is corrected and the measurement result; and
control processing of generating the restriction information in such a way as to gradually strengthen the restriction until the restriction satisfies a condition, and executing control in such a way that estimation of the movement locus in the estimation processing, correction of the movement locus in the correction processing based on the restriction information that is generated, and generation of the estimation result in the generation processing are repeatedly performed.

This application is based upon and claims the benefit of priority from Japanese patent application No. 2019-002687, filed on Jan. 10, 2019, the disclosure of which is incorporated herein in its entirety by reference.

REFERENCE SIGNS LIST

1 Wireless communication failure analysis system
10 Wireless communication failure analysis device
11 Estimation unit
12 Correction unit
13 Generation unit
14 Control unit
15 Storage unit
151 Measurement result
152 Signal transmission model
153 Movement locus
154 Restriction information
155 Corrected movement locus
156 Obstacle estimation result
20 Communication terminal device
21 Communication state measurement unit
30 Management terminal device
40 Wireless communication failure analysis device
400 Measurement result
41 Estimation unit
410 Movement locus
42 Correction unit
420 Corrected movement locus
43 Generation unit
430 Estimation result
44 Control unit
440 Condition
441 Restriction information
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A wireless communication failure analysis device comprising:
at least one memory configured to store instructions; and
at least one processor configured to execute the instructions to:
estimate a movement locus of a communication terminal device communicable with an access point installed at a known position, based on a measurement result indicating a communication state between the access point and the communication terminal device, which changes along with movement of the communication terminal device, and an estimation result relating to a presence situation of an obstacle that affects the communication state;
correct the movement locus, based on restriction information indicating a restriction content relating to movement of the communication terminal device;
generate the estimation result, based on the movement locus that is corrected and the measurement result; and
generate the restriction information in such a way as to gradually strengthen the restriction content until the restriction content satisfies a condition,
wherein estimation of the movement locus, correction of the movement locus based on the generated restriction information that is generated, and generation of the estimation result are repeatedly performed.

2. The wireless communication failure analysis device according to claim 1, wherein
the at least one processor sets, as the condition, a restriction content relating to movement of the communication terminal device when the measurement result is acquired, and sets, as an initial value of the restriction information, a restriction content that is weaker than the restriction content relating to movement of the communication terminal device when the measurement result is acquired.

3. The wireless communication failure analysis device according to claim 1, wherein
the at least one processor generates the restriction information indicating a maximum speed or maximum acceleration relating to movement of the communication terminal device in such a way that the maximum speed or the maximum acceleration is gradually reduced.

4. The wireless communication failure analysis device according to claim 1, wherein
the at least one processor sets, as an initial value of the estimation result, that there is no obstacle that affects the communication state.

5. The wireless communication failure analysis device according to claim 1, wherein
the at least one processor estimates, as a position of the communication terminal device, a position at which a difference between a value indicating the measurement result and a value indicating the communication state that is estimated based on the estimation result becomes smallest at each time point indicated in the measurement result.

6. The wireless communication failure analysis device according to claim 1, wherein
the at least one processor generates, as the movement locus that is corrected, a movement locus having a smallest difference from the movement locus that is estimated by the estimator among the movement locus satisfying the restriction content that is indicated in the restriction information.

7. The wireless communication failure analysis device according to claim 1, wherein
the at least one processor generates a signal transmission model relating to communication between the access point and the communication terminal device, based on the estimation result, and
the at least one processor generates the estimation result in such a way that a difference between the signal transmission model and the measurement result assuming that the communication terminal device moves in the movement locus that is corrected becomes smallest.

8. The wireless communication failure analysis device according to claim 1, wherein
the at least one processor uses the measurement result indicating a received signal strength indicator, which is measured by at least any one of the access point, the communication terminal device, and a dedicated measurement device.

9. The wireless communication failure analysis device according to claim 1, wherein
the at least one processor outputs, to an external device, information indicating the movement locus and the estimation result that are generated based on the restriction information in which the restriction content satisfies the condition.

10. A wireless communication failure analysis system comprising:
the wireless communication failure analysis device according to claim 1;
the communication terminal device; and
the access point.

11. A wireless communication failure analysis method executed by an information processing device, the method comprising:
estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state;
correcting the movement locus, based on restriction information indicating a restriction content relating to movement of the communication terminal device;
generating the estimation result, based on the movement locus that is corrected and the measurement result; and
generating the restriction information in such a way as to gradually strengthen the restriction content until the restriction content satisfies a condition,
wherein estimation of the movement locus, correction of the movement locus based on the restriction information that is generated, and generation of the estimation result are repeatedly performed.

12. A non-transitory computer readable recording medium that stores a wireless communication failure analysis program for causing a computer to execute:
estimation processing of estimating a movement locus of a communication terminal device communicable with an access point being installed at a known position, based on a measurement result indicating a communication state between the access point and the communication terminal device, which changes along with movement of the communication terminal device, and an estimation result relating to a presence situation of an obstacle that affects the communication state;
correction processing of correcting the movement locus, based on restriction information indicating a restriction content relating to movement of the communication terminal device;
generation processing of generating the estimation result, based on the movement locus that is corrected and the measurement result; and
control processing of generating the restriction information in such a way as to gradually strengthen the restriction content until the restriction content satisfies a condition,
wherein estimation of the movement locus, correction of the movement locus in the correction processing based on the restriction information that is generated, and generation of the estimation result are repeatedly performed.

13. The wireless communication failure analysis device according to claim 2, wherein
the at least one processor generates the restriction information indicating a maximum speed or maximum acceleration relating to movement of the communication terminal device in such a way that the maximum speed or the maximum acceleration is gradually reduced.

14. The wireless communication failure analysis device according to claim 2, wherein
the at least one processor sets, as an initial value of the estimation result, that there is no obstacle that affects the communication state.

15. The wireless communication failure analysis device according to claim 3, wherein
the at least one processor sets, as an initial value of the estimation result, that there is no obstacle that affects the communication state.

16. The wireless communication failure analysis device according to claim 2, wherein
the at least one processor estimates, as a position of the communication terminal device, a position at which a difference between a value indicating the measurement result and a value indicating the communication state that is estimated based on the estimation result becomes smallest at each time point indicated in the measurement result.

17. The wireless communication failure analysis device according to claim 3, wherein
the at least one processor estimates, as a position of the communication terminal device, a position at which a difference between a value indicating the measurement result and a value indicating the communication state that is estimated based on the estimation result becomes smallest at each time point indicated in the measurement result.

18. The wireless communication failure analysis device according to claim 4, wherein
the at least one processor estimates, as a position of the communication terminal device, a position at which a difference between a value indicating the measurement result and a value indicating the communication state that is estimated based on the estimation result becomes smallest at each time point indicated in the measurement result.

19. The wireless communication failure analysis device according to claim 2, wherein
the at least one processor generates, as the movement locus that is corrected, a movement locus having a smallest difference from the movement locus that is estimated by the estimator among the movement locus satisfying the restriction content that is indicated in the restriction information.

20. The wireless communication failure analysis device according to claim 3, wherein
the at least one processor generates, as the movement locus that is corrected, a movement locus having a smallest difference from the movement locus that is estimated by the estimator among the movement locus satisfying the restriction content that is indicated in the restriction information.

* * * * *